US010657482B2

(12) United States Patent
Kurjanowicz et al.

(10) Patent No.: US 10,657,482 B2
(45) Date of Patent: May 19, 2020

(54) DYNAMIC ORGANIZATION STRUCTURE MODEL

(71) Applicant: ADP, LLC, Roseland, NJ (US)

(72) Inventors: Agatha Kurjanowicz, Ottawa (CA); Ashish Bidadi, New York, NY (US); Karishma Velingkar, Secaucus, NJ (US); Ayeshaseerin Shahulhameed, Edison, NJ (US); Andrew Adams Kuntz, New York, NY (US); Dimple Bhailal Mange, New York, NY (US); Neena Gupta, Forest Hills, NY (US)

(73) Assignee: ADP, LLC, Roseland, NJ (US)

(*) Notice: Subject to any disclaimer, the term of this patent is extended or adjusted under 35 U.S.C. 154(b) by 637 days.

(21) Appl. No.: 15/184,835

(22) Filed: Jun. 16, 2016

(65) Prior Publication Data
US 2017/0364841 A1 Dec. 21, 2017

(51) Int. Cl.
G06Q 10/00 (2012.01)
G06Q 10/06 (2012.01)
G06Q 50/10 (2012.01)
G06F 16/28 (2019.01)

(52) U.S. Cl.
CPC ......... *G06Q 10/067* (2013.01); *G06F 16/288* (2019.01); *G06Q 50/10* (2013.01)

(58) Field of Classification Search
None
See application file for complete search history.

(56) References Cited

U.S. PATENT DOCUMENTS

| 8,903,848 | B1 | 12/2014 | Bahrami et al. | |
| 2002/0188458 | A1* | 12/2002 | Babbrah | G06Q 30/02 709/203 |
| 2003/0018510 | A1* | 1/2003 | Sanches | G06Q 10/06 717/102 |
| 2005/0120021 | A1 | 6/2005 | Tang et al. | |
| 2008/0120129 | A1* | 5/2008 | Seubert | G06Q 10/06 705/35 |
| 2009/0043621 | A1* | 2/2009 | Kershaw | G06Q 10/06 705/7.16 |
| 2009/0172035 | A1* | 7/2009 | Lessing | G06F 16/284 |
| 2010/0023519 | A1* | 1/2010 | Kailash | H04L 63/10 707/E17.007 |
| 2011/0035444 | A1* | 2/2011 | Hill | G06Q 10/10 709/204 |
| 2011/0197061 | A1* | 8/2011 | Chou | H04L 9/006 713/156 |

(Continued)

Primary Examiner — Gurkanwaljit Singh
(74) Attorney, Agent, or Firm — Yee & Associates, P.C.

(57) ABSTRACT

A method and apparatus model multiple relationship dimensions among a set of entities is presented. A computer system identifies a configuration for the structure. The configuration comprises metadata about supported relationship aspects for the set of entities within a structure context. The computer system identifies aspects for an entity according to the structure context. The entity aspects comprise metadata about relationships for the entity within the structure context. The computer system compares the entity aspects to the configuration for the structure to determine a relationship of the entity to the set of entities. The computer system dynamically attaches the entity to the set of entities according to the determined relationship to form the structure.

21 Claims, 21 Drawing Sheets

(56) References Cited

U.S. PATENT DOCUMENTS

| | | | |
|---|---|---|---|
| 2012/0136688 A1* | 5/2012 | Fouad | G05B 23/0294 |
| | | | 705/7.15 |
| 2012/0197890 A1 | 8/2012 | Franks et al. | |
| 2012/0215777 A1 | 8/2012 | Malik et al. | |
| 2013/0103553 A1* | 4/2013 | McGill | G06Q 40/00 |
| | | | 705/30 |
| 2014/0068021 A1* | 3/2014 | Arseniev | G06F 15/177 |
| | | | 709/220 |
| 2014/0075004 A1* | 3/2014 | Van Dusen | H04L 41/04 |
| | | | 709/223 |
| 2014/0115012 A1 | 4/2014 | Das | |

* cited by examiner

DYNAMIC ORGANIZATION STRUCTURE MODEL

BACKGROUND INFORMATION

1. Field

The present disclosure relates generally to an improved computer system and, in particular, to a method, apparatus, and computer program product for modeling relationships among a set of entities. Still more particularly, the present disclosure relates to a method and apparatus for modeling multiple relationship dimensions among a set of entities to users of the computer system.

2. Background

Information systems are used for many different purposes. For example, an information system may be used to process payroll to generate paychecks for employees in an organization. Additionally, an information system also may be used by a human resources department to maintain benefits and other records about employees. For example, a human resources department may manage health insurance, wellness plans, and other programs and organizations using an employee information system. As yet another example, an information system may be used to determine when to hire new employees, assign employees to projects, perform reviews for employees, and other suitable operations for the organization. As another example, a research department in the organization may use an information system to store and analyze information to research new products, perform reviews of employees, hire new employees, analyze products, or for other suitable operations.

Currently used information systems include databases. These databases store information about the organization. For example, these databases store information about employees, products, research, product analysis, business plans, and other information about the organization.

Information in databases can be accessed through a graphical user interface of a computer system. The information systems may be used in performing operations for an organization. The operations may include hiring operations and project assignments.

However, the information organization methods and data models currently used to store information for an organization do not provide a holistic view of the interdependencies among organization units. To accomplish a single organizational goal, the business environment often relies on many dependencies among tasks performed by separate organization units. The interdependencies and relations between these organization units may not always be readily apparent when viewing information using current information organization methods and data models. As a result, individual employees often lack an understanding of how their work effort impacts and enables others to contribute to such goals.

Furthermore, the time and resources needed to provide information organization methods and data models for an organization may be greater than desired. Current methods and systems for organizing information often results in a bloated data model, requiring significant computational resources and programming time. Therefore, implementing an information organization for viewing of the interdependencies among organization units may require more time and resources than desired.

Therefore, it would be desirable to have a method and apparatus that take into account at least some of the issues discussed above, as well as other possible issues. For example, it would be desirable to have a method and apparatus that overcome issues with information organization methods and systems that result in a lack of understanding of the multiple relationship dimensions among a set of entities necessary for accomplishing business goals of the organization.

SUMMARY

An embodiment of the present disclosure provides a method for modeling multiple relationship dimensions among a set of entities. The method comprises identifying, by a computer system, a configuration for the structure. The configuration comprises metadata about supported relationship aspects for the set of entities within a structure context. Further, the method comprises identifying, by the computer system, aspects for an entity according to the structure context. The entity aspects comprises metadata about relationships for the entity within the structure context. Still further, the method comprises comparing the entity aspects to the configuration for the structure to determine a relationship of the entity to the set of entities. Still further, the method comprises dynamically attaching the entity to the set of entities according to the determined relationship to form the structure.

Another embodiment of the present disclosure provides a computer system modeling multiple relationship dimensions among a set of entities. The computer system comprises a relationship modeler that identifies a configuration for the structure. The configuration comprises metadata about supported relationship aspects for the set of entities within a structure context. Further, the relationship modeler identifies aspects for an entity according to the structure context. The entity aspects comprises metadata at which the entity within the structure context. Still further, the relationship modeler compares the entity aspects to the configuration for the structure to determine a relationship of the entity to the set of entities. Still further, the relationship modeler dynamically attaches the entity to the set of entities according to determined relationship to form the structure.

Yet another embodiment of the present disclosure provides a computer program product for modeling multiple relationship dimensions among a set of entities. The computer program product comprises a computer readable storage media, first program code, second program code, third program code, and fourth program code. The first program code, the second program code, the third program code, and the fourth program code are stored on the computer readable storage media. The first program code, when executed by a computer system, identifies a configuration for the structure. The configuration comprises metadata about supported relationship aspects for the set of entities with in a structure context. The second program code, when executed by the computer system, identifies aspects for an entity according to the structure context. The entity aspects of comprises metadata about relationships for the entity within the structure context. The third program code, when executed by the computer system, compares the entity aspects to the configuration for the structure to determine a relationship of the entity to the set of entities. The fourth program code, when executed by the computer system, dynamically attaches the entity to the set of entities according to be determined relationship to form the structure.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that information organization methods and data models storing information for an organization that provide a holistic view of the interdependencies among organization units is desirable. The illustrative embodiments recognize and take into account that accomplishing a single organizational goal, the business environment often relies on many dependencies among tasks performed by separate organization units. The illustrative embodiments recognize and take into account that viewing information in a manner that makes interdependencies and relations between these organization units readily apparent is also desirable. Additionally, the illustrative embodiments recognize and take into account that providing an understanding between the interdependencies and relationships among organizational units contributes to effective accomplishment of organizational goals.

The illustrative embodiments recognize and take into account, however, that the time and resources needed to provide information organization methods and data models for an organization may be greater than desired. The illustrative embodiments recognize and take into account that current methods and systems for organizing information often results in a bloated data model, requiring significant computational resources and programming time. Illustrative embodiments recognize and take into account that implementing an information organization for viewing of the interdependencies among organization units using currently available information organization methods and data models may require more time and resources than desired.

Thus, the illustrative embodiments provide a method and apparatus for modeling multiple relationship dimensions among a set of entities. In one illustrative example, a method for modeling multiple relationship dimensions among a set of entities is presented. A computer system identifies a configuration for the structure. The configuration comprises metadata about supported relationship aspects for the set of entities within a structure context. Further, the computer system identifies aspects for an entity according to the structure context. The entity aspects comprise metadata about relationships for the entity within the structure context. Still further, the computer system compares the entity aspects to the configuration for the structure to determine a relationship of the entity to the set of entities. Still further, the computer system dynamically attaches the entity to the set of entities according to the determined relationship to form the structure.

Figure 1:
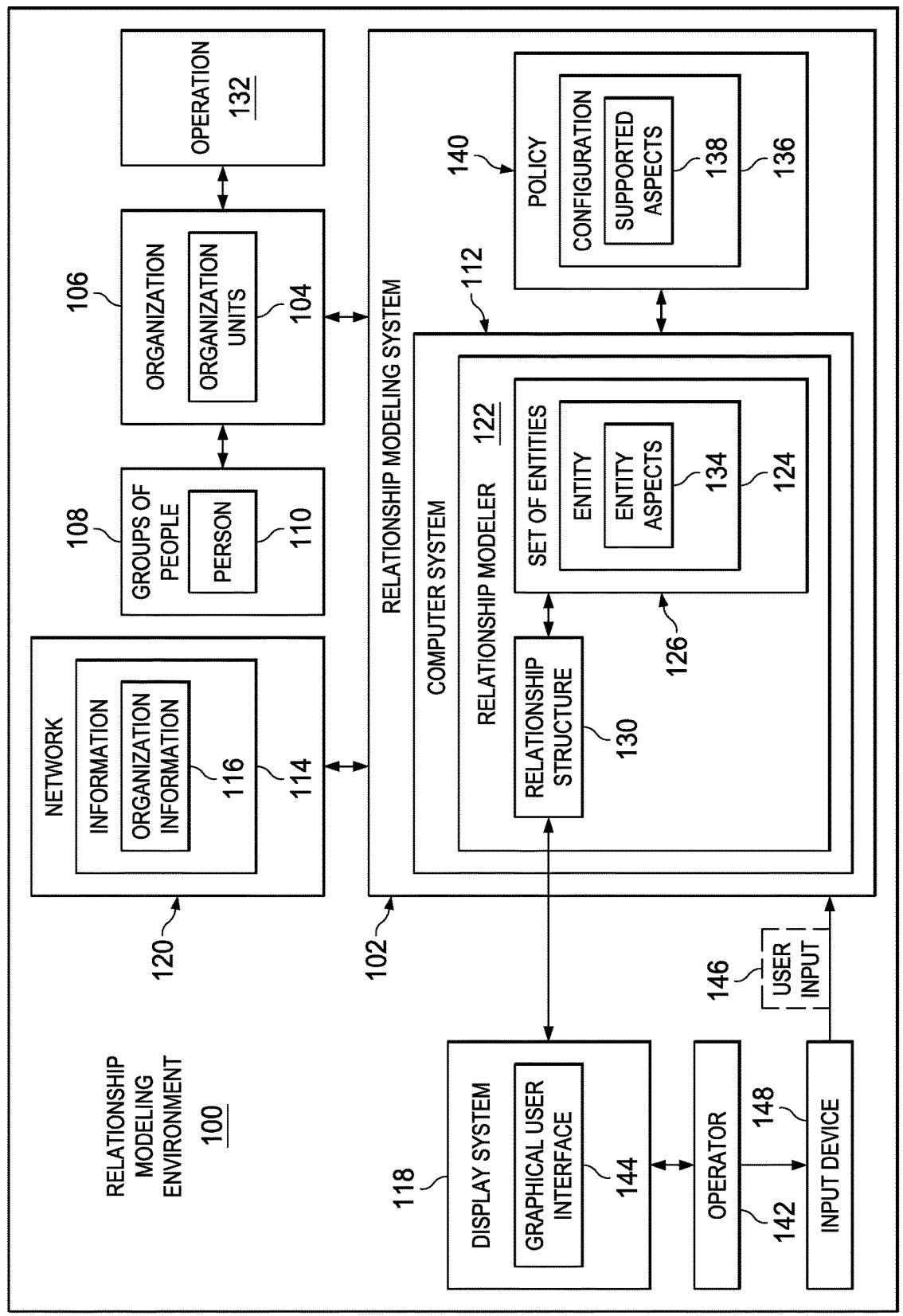
FIG. 1 is a block diagram of a relationship modeling environment depicted in accordance with an illustrative embodiment.

With reference now to the figures and, in particular, with reference to FIG. 1, an illustration of a block diagram of a relationship modeling environment is depicted in accordance with an illustrative embodiment. In this illustrative example, relationship modeling environment 100 includes relationship modeling system 102. Relationship modeling system 102 models relationships between different organization units 104 of organization 106. Relationship modeling system 102 identifies a configuration for a relationship structure, including metadata about supported relationship aspects or entities model and structure. Relationship modeling system 102 identifies entity aspects for an entity according to the structure context, including metadata about relationship aspects for the entity. Based on a comparison between the entity aspects to the configuration for the structure, relationship modeling system 102 determines a relationship of the entity to other entities in the relationship structure. Relationship modeling system 102 then dynamically attaches the entity to the relationship structure according to the determined relationship.

Organization 106 may be, for example, a corporation, a partnership, a charity, a city, a government agency, or some other suitable type of organization. Organization units 104 may be, for example, at least one of teams, departments, divisions, or some other suitable type of organizational unit within organization 106. Additionally, organization units 104 may include positions and personnel having a relationship with organization 106. In this illustrative example, organization units 104 may include one or more of groups of people 108 or person 110. Groups of people 108 can be, for example at least one of people, employees, customers, vendors, or some other suitable type of group of people. Person 110 is a person included in one or more of groups of people 108.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combination of these items may be present. In some illustrative examples, "at least one of" may be, for example, without limitation, two of item A; one of item B; and ten of item C; four of item B and seven of item C; or other suitable combinations.

In this illustrative example, relationship modeling system 102 includes computer system 112. Computer system 112 may be selected from one of an employee information system, a research information system, a sales information system, an accounting system, a payroll system, or some other type of information system that stores and provides access to information 114. As depicted, computer system 112 may be used to access information 114. The access may include at least one of reading, writing, modifying, or operating on information 114.

In this illustrative example, information 114 includes organization information 116. Organization information 116 may include, for example, at least one of information about people, products, benefits, payroll, research, product analysis, business plans, financials, or some other information relating to organization 106. In one illustrative example, organization information 116 includes information about relationships among organization units 104.

As depicted, computer system 112 is a physical hardware system that includes one or more data processing systems. When more than one data processing system is present, those data processing systems may be in communication with each other using a communications medium. The communications medium may be a network, such as network 120. The data processing systems may be selected from at least one of a computer, a server computer, a workstation, a tablet computer, a laptop computer, a mobile phone, or some other suitable data processing system. Output from computer system 112 may be displayed on display system 118.

As depicted, display system 118 is a physical hardware system and includes one or more display devices. The display devices may include at least one of a light emitting diode (LED) display, a liquid crystal display (LCD), an organic light emitting diode (OLED) display, or some other suitable display device.

Computer system 112 may access information 114 through network 120. Network 120 is located in at least one of relationship modeling system 102 or outside of relationship modeling system 102. For example, network 120 may include at least one of a local area network (LAN), a wide area network (WAN), the Internet, an intranet, or some other suitable type of network.

In this illustrative example, computer system 112 includes relationship modeler 122. Relationship modeler 122 models relationships among organization units 104. Relationship modeler 122 may be implemented in software, hardware, firmware, or a combination thereof. When software is used, the operations performed by relationship modeler 122 may be implemented in program code configured to be loaded and run on hardware, such as a processor unit. When firmware is used, the operations performed by relationship modeler 122 may be implemented in program code and data and stored in persistent memory to run on a processor unit. When hardware is employed, the hardware may include circuits that operate to perform the operations in relationship modeler 122.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In this illustrative example, relationship modeler 122 models each of organization units 104 as a separate entity 124 in set of entities 126. Relationship modeler 122 attaches entity 124 to set of entities 126 to form relationships structure 130. Relationship structure 130 is a schematic representation modeling how entity 124 is related to other entities of set of entities 126. Relationship modeler 122 displays relationship structure 130 on display system 118. By displaying relationships among set of entities 126, relationship structure 130 enables more efficient performance of operation 132 for organization 106. In this illustrative example, operation 132 is an operation performed for the benefit of organization 106. Operation 132 can be selected from at least one of hiring, benefits administration, payroll, performance reviews, forming teams for new products, assigning research projects, or other suitable operations for organization 106.

In one illustrative example, relationship modeler 122 dynamically attaches entity 124 to set of entities 126 according to entity aspects 134 and configuration 136. Entity aspects 134 are one or more attributes, roles, or relationships, describing the identity, function, associations of entity 124 within relationship structure 130. In one illustrative example, entity aspects 134 are stored as metadata for entity 124.

In this illustrative example, configuration 136 is a set of rules within policy 140 for the configuration of set of entities 126 within relationship structure 130. Policy 140 is a group of rules. Policy 140 also may include data used to apply the group of rules. As used herein, the "group of," when used with reference to items, means one or more items. For example, a "group of rules" is one or more rules.

Configuration 136 may include, for example, one or more rules for the configuration of set of entities 126 within relationship structure 130. In one illustrative embodiment, configuration 136 may include, for example, a rule indicating supported aspects 138. Supported aspects 138 are aspects supported by relationship structure 130. In this illustrative example, supported aspects 138 can include at least one of roles supported by relationship structure 130 and relationships supported by relationship structure 130. Additionally, supported aspects 138 may include one or more rules identifying how one or more supportive roles relates to another one or more supportive roles according to a supported relationship.

As depicted, entity 124 is attached to set of entities 126 by comparing entity aspects 134 to configuration 136. For example, relationship modeler 122 determines whether entity aspects 134 meets policy 140 based on a determination of whether entity aspects 134 conforms to supported aspects 138 of configuration 136. When entity aspects 134 conforms to supported aspects 138 of configuration 136, relationship modeler 122 attaches entity 124 to set of entities 126 according to one or more rules in configuration 136 identifying how entity 124 relates to set of entities 126. In this manner, entity 124 is attached to set of entities 126 in a manner that meets policy 140.

In the illustrative example, operator 142 may interact with relationship structure 130 through graphical user interface 144 displayed on display system 118 to access information 114 about relationships among set of entities 126. In the illustrative example, relationship modeler 122 presents information 114 about relationships among set of entities 126 within a graphical user interface 144 such that information 114 can be efficiently and easily utilized in performing operation 132.

Operator 142 is a human being who interacts with relationship structure 130 through user input 146 generated by input device 148. As depicted, input device 148 is a physical hardware system and includes at least one of a mouse, a keyboard, a trackball, a touchscreen, a stylus, a motion sensing input device, a cyberglove, or some other suitable type of input device.

As a result, information 114 describing relationships among organization units 104 is displayed as relationship structure 130 in graphical user interface 144 according to configuration 136, and may be relied upon to perform operation 132 for organization 106 more efficiently and easily based on an identification of relationships among set of entities 126 using relationship modeler 122. In other words, entity 124 is attached to set of entities 126 in relationship structure 130 only if entity aspects 134 of entity 124 meets configuration 136 for relationship structure 130 as defined by policy 140. In this manner, performing operation 132 for organization 106 is more efficiently and easily enabled based on generating relationship structure 130 displayed on display system 118.

The illustrative example in FIG. 1 and the examples in the other subsequent figures provide one or more technical solutions to overcome a technical problem of modeling multiple relationship dimensions among a set of entities consistent with organization units that make for the efficient performance of operations in an information system more cumbersome and time-consuming than desired. For example, relationship modeler 122 attaches entity 124 to set of entities 126 in relationship structure 130 only if entity aspects 134 of entity 124 meets configuration 136 for relationship structure 130 as defined by policy 140.

In this manner, the use of relationship modeler 122 has a technical effect of reducing time, effort, or both in generating relationship structure 130 for displaying relationships among organization units 104 on display system 118. In this manner, operation 132 performed for organization 106 may be performed more efficiently as compared to currently used systems. For example, relationship structure 130 may be used to display information 114, including relationships among organization units 104, enabling more efficient performance of operation 132, selected from at least one of hiring, benefits administration, payroll, performance reviews, forming teams for new products, assigning research projects, or other suitable operations for organization 106.

As a result, computer system 112 operates as a special purpose computer system in which relationship modeler 122 in computer system 112 enables modeling multiple relationship dimensions among set of entities 126 in a manner that is consistent with organization units 104 for display in graphical user interface 144 of display system 118. For example, relationship modeler 122 enables generating relationship structure 130 that attaches entity 124 to set of entities 126 in relationship structure 130 only if entity aspects 134 of entity 124 meets configuration 136 for relationship structure 130 as defined by policy 140. For example, entity 124 is attached to set of entities 126 to form relationship structure 130 only when entity aspects 134 meets one or more rules in policy 140 for configuration 136.

Thus, relationship modeler 122 transforms computer system 112 into a special purpose computer system as compared to currently available general computer systems that do not have relationship modeler 122. Currently used general computer systems do not reduce the time or effort needed to enable modeling multiple relationship dimensions among set of entities 126 in a manner that is consistent with organization units 104 four displayed in graphical user interface 144 of display system 118. Further, currently used general computer systems do not provide modeling multiple relationship dimensions among set of entities 126 to form relationship structure 130 only when entity aspects 134 meets one or more rules in policy 140 for configuration 136.

Figure 2:
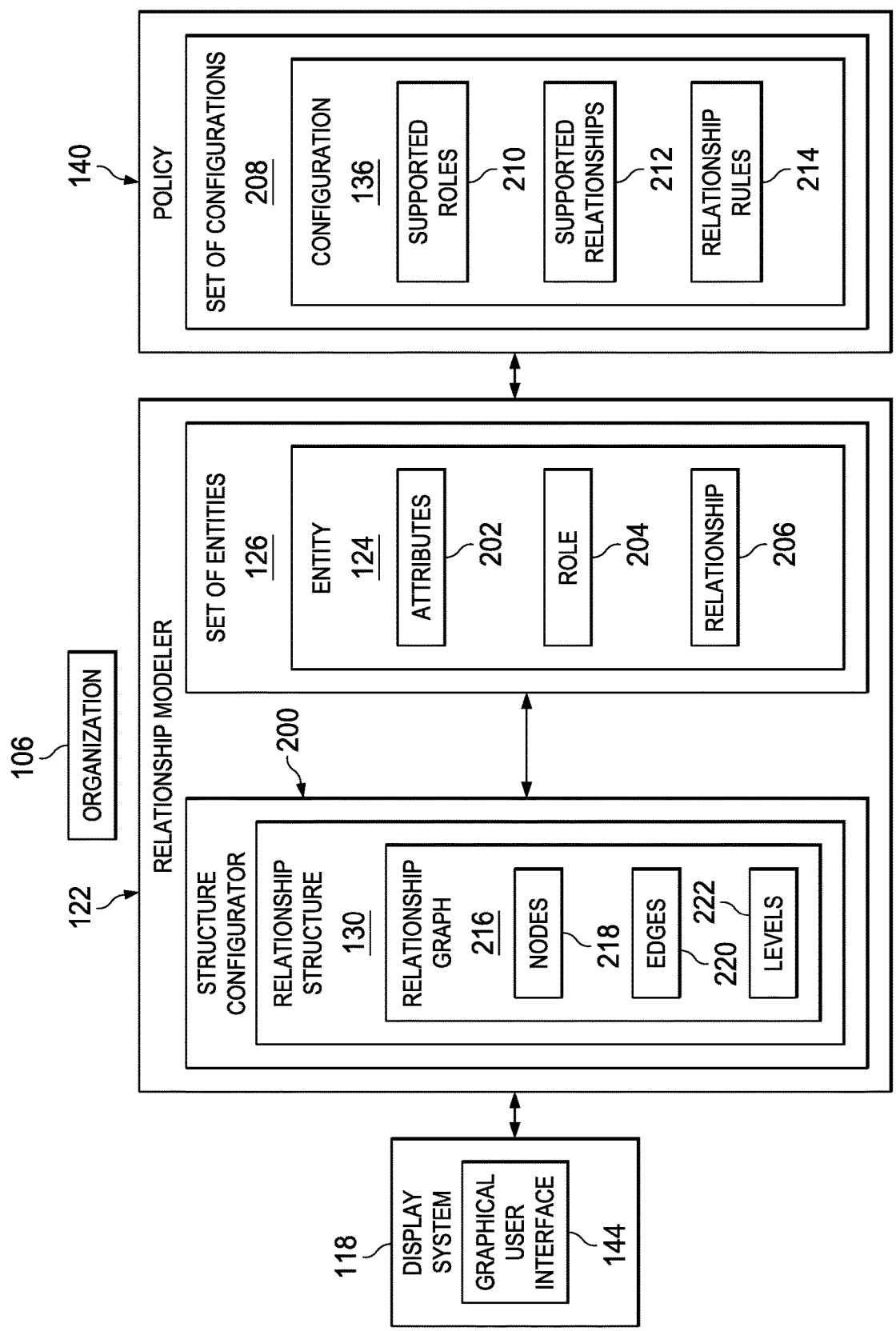
FIG. 2 is a data flow diagram for modeling multiple relationship dimensions among a set of entities according to a configuration for the relationship structured depicted in accordance with an illustrative embodiment.

With reference to FIG. 2, a data flow diagram for modeling multiple relationship dimensions among set of entities according to a configuration for the relationship structure is depicted in accordance with an illustrative embodiment. In this figure, an example of a data generating relationship structure 130 according to configuration 136 through relationship modeler 122 is shown. In the illustrative examples, the same reference numeral may be used in more than one figure. This reuse of a reference numeral in different figures represents the same element in the different figures.

As depicted, relationship modeler 122 has a number of different components. As used herein, a "number of items" means one or more items. For example, "a number of different components" means one or more components. As depicted, relationship modeler 122 includes set of entities 126 and structure configurator 200.

As depicted, entity 124 in set of entities 126 includes a number of entity aspects 134, shown in block form in FIG. 1. As depicted, entity 124 includes attributes 202, role 204, and relationship 206.

Attributes 202 is one of entity aspects 134, shown in block form in FIG. 1. As depicted, attributes 202 is informative text providing identifying information for organization unit 104, shown in block form in FIG. 1, corresponding to entity 124. In one illustrative example, attributes 202 includes at least one of a name of entity 124, a description of entity 124, and other suitable information for identifying organization 106, corresponding to entity 124.

As depicted, entity 124 includes role 204. Role 204 is one of entity aspects 134, shown in block form in FIG. 1. Role 204 is a role of organization unit 104 within the context of organization 106. Role 204 indicates how entity 124 functions within relationship structure 130. Entity 126 has at least one role 204 within the context of relationship structure 130.

In one illustrative example, role 204 is a role within the context of a human resources structure for organization 106. In this illustrative example, role 204 can be selected from an organization unit, a business unit, a division, a department, a sub-department, a team, and other suitable roles within the context of a human resources structure for organization 106.

In yet another illustrative example, role 204 is a role within the context of a legal entity structure for organization 106. In this illustrative example, role 204 can be selected from a company code, a legal entity, a global ultimate, a domestic ultimate, and other suitable roles within the context of a legal entity structure for organization 106.

In yet another illustrative example, role 204 is a role within the context of a costing structure for organization 106. In this illustrative example, role 204 can be selected from a costing group, a cost center, and other suitable roles within the context of a costing structure for organization 106.

In yet another illustrative example, role 204 is a role within the context of a client for organization 106. In this illustrative example, role 204 can be selected from a head, a subhead, and other suitable roles within the context of a client for organization 106.

As depicted, entity 124 includes relationship 206. Relationship 206 is one of entity aspects 134, shown in block form in FIG. 1. Relationship 206 is a relationship of organization unit 104 within the context of organization 106. Relationship 206 indicates how entity 124 is related to set of entities 126 within relationship structure 130. To avoid the creation of a disjointed relationship structure by relationship modeler 122, entity 124 includes at least one relationship 206.

In one illustrative example, relationship 206 is a relationship within the context of a core structure for organization 106. In this illustrative example, relationship 206 can be selected from a "part of" relationship, and other suitable relationships within the context of a core structure for organization 106. When relationship 206 indicates that entity 124 is "part of" a related one of set of entities 126, entity 124 can be, for example, a subdivision within related one of set of entities 126.

In another illustrative example, relationship 206 is a relationship within the context of a human resources reporting structure for organization 106. In this illustrative example, relationship 206 can be selected from an "belongs to" relationship, and "manages" relationship, and "contributing" relationship, and "semi-authoritative" relationship, and other suitable relationships within the context of a human resources reporting structure for organization 106.

In yet another illustrative example, relationship 206 is a relationship within the context of a legal entity structure for organization 106. In this illustrative example, relationship 206 can be selected from an "enterprise" relationship, and other suitable relationships within the context of legal entity structure for organization 106.

As depicted, policy 140 includes set of configurations 208. Set of configurations 208 includes a number of different configurations, such as configuration 136. Each of set of configurations 208 defines a set of rules for configuring the different to a different relationship structure, such as relationship structure 130.

As depicted, configuration 136 in set of configurations 208 includes a number of supported aspects 138, shown in block form in FIG. 1. As depicted, configuration 136 includes supported roles 210, supported relationships 212, and relationship rules 214.

As depicted, configuration 136 includes supported roles 210. Supported roles 210 is one of supported aspects 138, shown in block form in FIG. 1. Supported roles 210 are roles allowable by configuration 136 for set of entities 126 within the context of relationship structure 130. In one illustrative example, supported roles 210 is a list of all roles that can apply to entity 124 within the context of relationship structure 130.

As depicted, configuration 136 includes supported relationships 212. Supported relationships 212 is one of supported aspects 138, shown in block form in FIG. 1. Supported relationships 212 are relationships allowable by configuration 136 for relationships between set of entities 126 within the context of relationship structure 130. In one illustrative example, supported roles 210 is a list of all relationships that can apply between set of entities 126 within the context of relationship structure 130.

As depicted, configuration 136 includes relationship rules 214. Relationship rules 214 is one of supported aspects 138, shown in block form in FIG. 1. In one illustrative example, relationship rules 214 includes one or more rules that define which of supported relationships 212 entity 124 can participate in based on role 204 of entity 124. In one illustrative example, relationship rules 214 includes one or more rules that define which of set of entities 126 can be attached to entity 124 based on supported relationships 212 for entity 124 and the role of attached one of set of entities 126. In one illustrative example, relationship rules 214 includes one or more rules that define a maximum number of allowed relationships originating entity 124 based on role 204.

Structure configurator 200 is a component within relationship modeler 122 that configures relationship structure 130 according to configuration 136. Structure configurator 200 identifies configuration 136 for relationship structure 130, including supported roles 210, supported relationships 212, and relationship rules 214. Structure configurator 200 identifies attributes 202, role 204, and relationship 206 for entity 124. Structure configurator 200 determines a relationship of entity 124 to set of entities 126 according to configuration 136. Relationship modeling system 102, shown in block form in FIG. 1, then dynamically attaches entity 124 to set of entities 126 according to configuration 136 to form relationship structure 130.

In this illustrative example, relationship structure 130 can take the form of relationship graph 216. As depicted, relationship graph 216 includes a number of different components. As depicted, relationship graph 216 includes nodes 218, edges 220, and levels 222.

As depicted, relationship graph 216 includes nodes 218. Each of nodes 218 corresponds to a different one of set of entities 126.

As depicted, relationship graph 216 includes edges 220. Each of edges 220 corresponds to a relationship between different ones of set of entities 126.

As depicted, relationship graph 216 can optionally include levels 222. Levels 222 provide additional information about organization 106 within the context of relationship structure 130. In one illustrative example, levels 222 provides an additional classification for a tiered hierarchy within a particular context of relationship structure 130. In one illustrative example, levels 222 can be selected from business area, division, departments, sub-departments, teams, and other suitable levels for relationship structure 130.

In this manner, relationship modeler 122 enables generating relationship structure 130 that attaches entity 124 to set of entities 126 in relationship structure 130 according to configuration 136 for relationship structure 130 as defined by policy 140. Operator 142, shown in block form in FIG. 1, may interact with relationship structure 130 through graphical user interface 144 displayed on display system 118 to access information about relationships among set of entities 126. Relationship modeler 122 presents relationship structure 130 within a graphical user interface 144 such that information, such as information 114 shown in block form in FIG. 1, can be efficiently and easily utilized when performing operations for organization 106.

Figure 3:
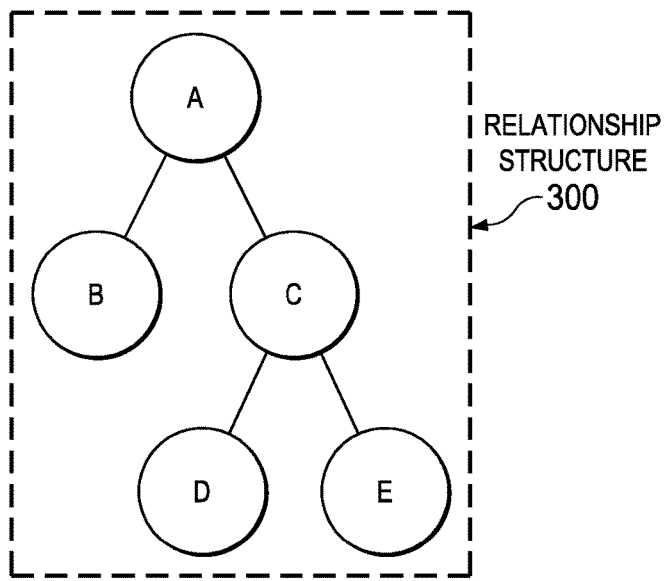
FIG. 3 is a relationship structure depicted in accordance with an illustrative embodiment.

Turning now to FIG. 3, a relationship structure is depicted in accordance with an illustrative embodiment. Relationship structure 300 is an example of relationship structure 130, shown in block form in FIG. 1.

Relationship structure 300 provides an overall view of the relationships among organization unit 104, shown in block form in FIG. 1. Relationship structure 300 is a connected graph, such as relationship graph 216 shown in block form in FIG. 2, of related nodes, such as nodes 218 shown in block form in FIG. 2. As depicted, relationship structure 300 is a schematic representation modeling how entity 124, shown in block form in FIG. 1, is related to other entities of set of entities 126, shown in block form in FIG. 1.

Relationship structure 300 excludes disjointed relationship structure by including only nodes within relationship structure 300 that are related to at least one other node in relationship structure 300.

Figure 4:
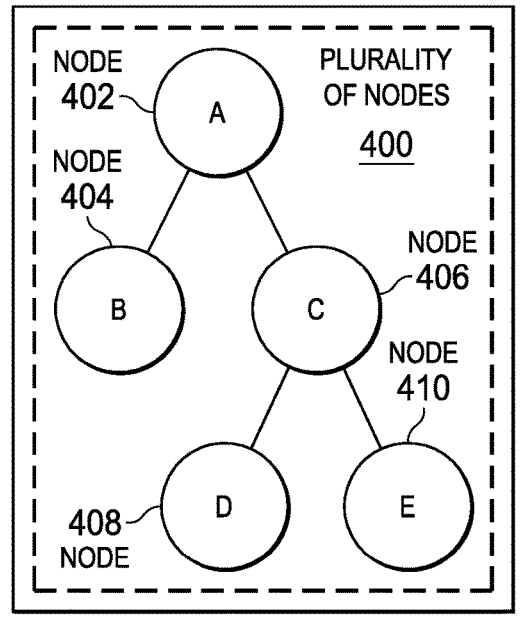
FIG. 4 is a schematic illustration of nodes within a relationship structure depicted in accordance with an illustrative embodiment.

Turning now to FIG. 4, nodes within a relationship structure are depicted in accordance with an illustrative embodiment. As depicted, FIG. 4 illustrates relationship structure 300 of FIG. 3 having a plurality of related nodes.

Relationship structure 300 includes a plurality of nodes 400. As depicted, plurality of nodes 400 includes node 402, node 404, node 406, node 408, and node 410. Each of plurality of nodes 400 is an example of nodes 418, depicted in block form in FIG. 2.

Each of the plurality of nodes 400 represents a discrete entity within the context of relationship structure 300. That is, each of plurality of nodes 400 represents a different one of set of entity 126, depicted in block form in FIG. 1.

To avoid the creation of disjointed relationship structures, each of nodes 404, 406, 408, and 410 includes at least one defined relationship context of relationship structure 300. In one illustrative example, relationship information for plurality of nodes 400 is stored in metadata on a child node as entity aspects, such as entity aspects 134 shown in block form in FIG. 1.

In this illustrative example, node 404 stores metadata describing the relationship between node 404 and node 402. Node 406 stores metadata describing the relationship between node 406 and node 402. Node 408 stores metadata describing the relationship between node 410 and node 406. Node 410 stores metadata describing the relationship between node 410 and node 406.

As depicted, node 402 is a root node within relationship structure 300. In this illustrative example, only one root node exists in relationship structure 300. Because relationship information for plurality of nodes 400 is stored on the child node, node 402 does not necessarily include metadata describing any defined relationship. That is, node 402 may not necessarily include either metadata describing the relationship between node 402 and node 404, or metadata describing the relationship between node 402 and node 406.

Figure 5:
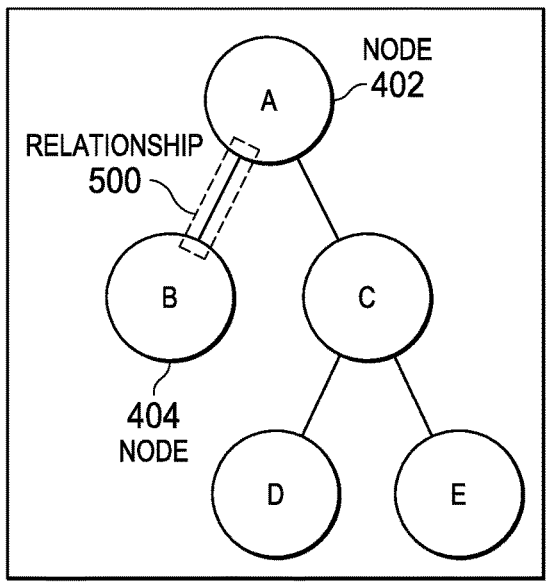
FIG. 5 is a schematic illustration of relationships within a relationship structure depicted in accordance with an illustrative embodiment.

Turning now to FIG. 5, relationships within a relationship structure are depicted in accordance with an illustrative embodiment. As depicted, FIG. 5 illustrates relationship structure 300 having a plurality of relationships among plurality of nodes 400.

Each of plurality of nodes 400 is related to at least one other node in relationship structure 300. Each relationship is depicted as an edge, such as one of edges 220 shown in block form in FIG. 2, within the connected graph of relationship structure 300. In this illustrative example, relationship 500 represents a relationship between node 402 and node 404.

Relationship 500 defines how node 404 is related to node 402 within the context of relationship structure 300. As depicted, node 404 is related to node 402 in a manner consistent a configuration of relationship structure 300, such as configuration 136 shown in block form in FIG. 1.

Each of plurality of nodes 400 is related to at least one other node in relationship structure 300. In this illustrative example, relationship information for plurality of nodes 400 is stored on the child node. Therefore, node 402 does not necessarily include metadata describing any defined relationship. However, node 402 still has relationship 500, based on metadata describing relationship 500 stored on node 404.

Figure 6:
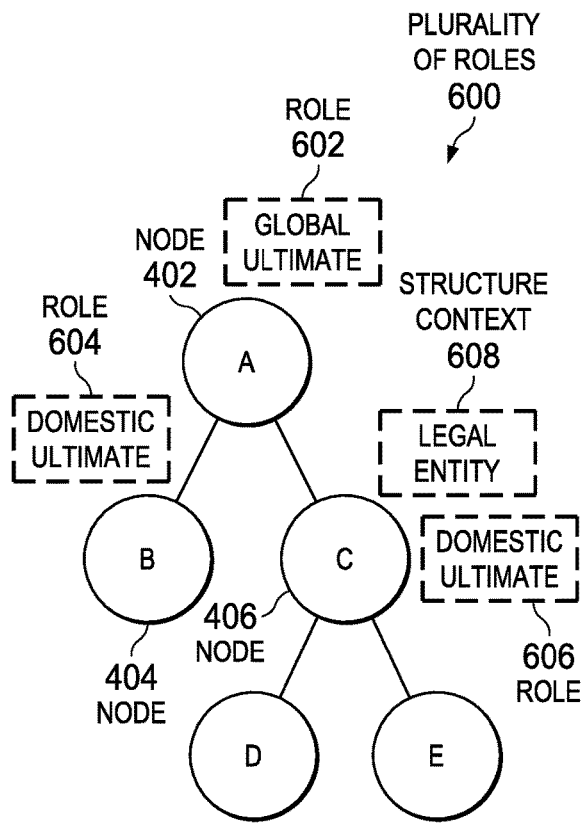
FIG. 6 is a schematic illustration of roles within a relationship structure depicted in accordance with an illustrative embodiment.

Turning now to FIG. 6, roles within a relationship structure are depicted in accordance and illustrative embodiment. As depicted, FIG. 6 illustrates plurality of nodes 400 of relationship structure 300 having one of a plurality of roles 600.

Each of plurality of roles 600 is metadata describing the function of a related one of plurality of nodes 400 within the structure context 608 of relationship structure 300. Each of plurality of nodes 400 includes at least one of plurality of roles 600.

For example, node 402 includes role 602 describing function of node 402 within the structure context 608 of relationship structure 300. Node 404 includes role 604 describing function of nodes 404 within the structure context 608 of relationship structure 300. Node 406 includes role 606, describing the function of node 404 within the structure context 608 of relationship structure 300.

Figure 7:
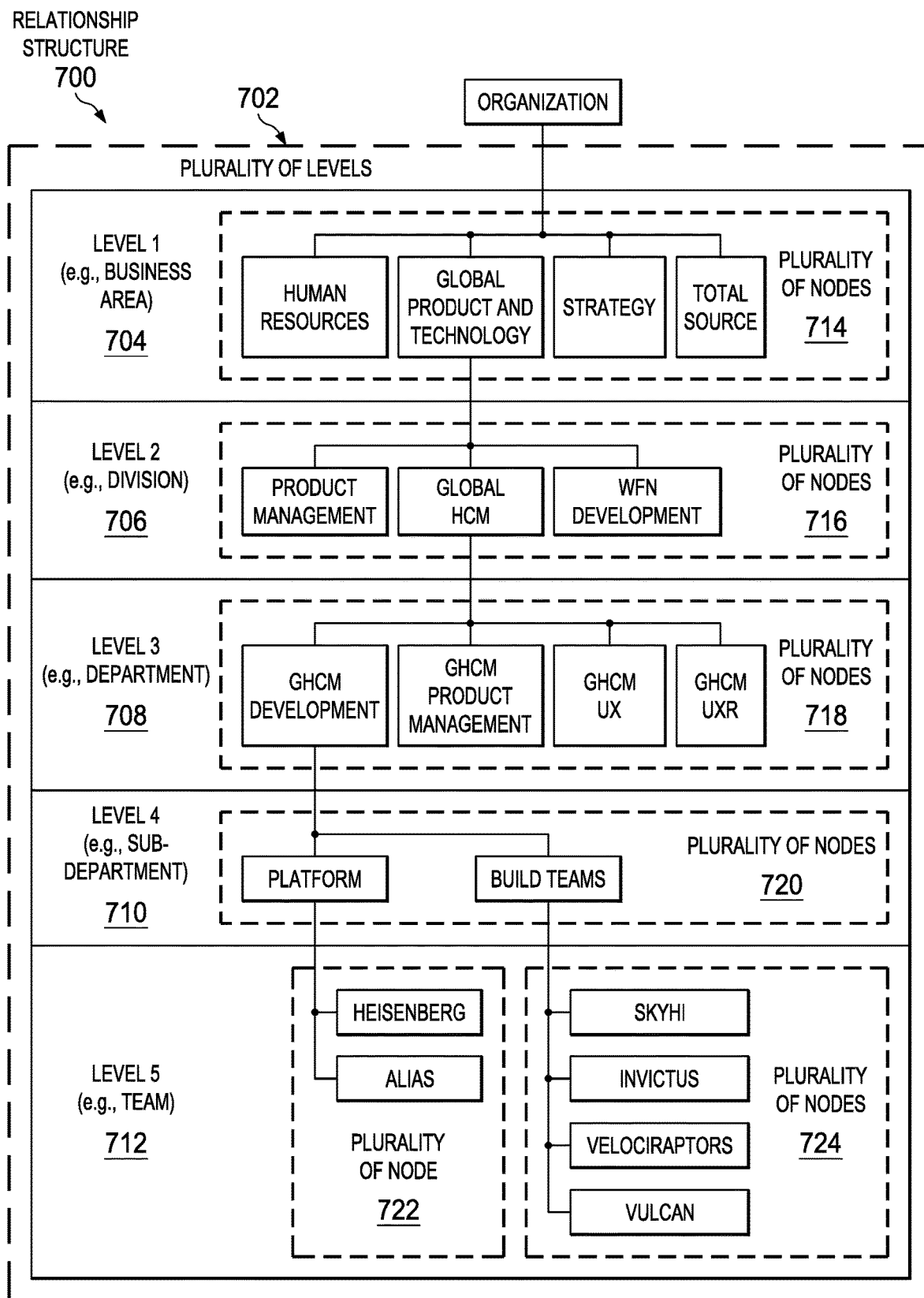
FIG. 7 is a schematic illustration of levels within a relationship structure depicted in accordance with an illustrative embodiment.

Turning now to FIG. 7, levels within a relationship structure are depicted in accordance with an illustrative embodiment. As depicted, relationship structure 700 is an example of relationship structure 130, shown in block form in FIG. 1. As depicted, relationship structure 700 includes a plurality of levels 702. Plurality of levels 702 are examples of levels 222, shown in block form in FIG. 2.

As depicted, plurality of levels 702 provides an additional classification for a tiered hierarchy within a particular context of relationship structure 700. In this illustrative example, plurality of levels 702 includes a number of different levels. As depicted, plurality of levels 702 includes level 704, level 706, level 708, level 710, and level 712.

As depicted, levels 704 includes plurality of nodes 714. Each of plurality of nodes 714 is an example of one of plurality of nodes 400, shown in block form in FIG. 4. Each of plurality of nodes 714 includes metadata regarding classification and level 704.

In this illustrative example, level 704 is a level that includes "business areas" for an organization, such as organization 106 shown in block form in FIG. 1. Each of plurality of nodes 714 represents a "business area" organization unit, such as organization 106 shown in block form in FIG. 1.

As depicted, levels 706 includes plurality of nodes 716. Each of plurality of nodes 716 is an example of one of plurality of nodes 400, shown in block form in FIG. 4. Each of plurality of nodes 716 includes metadata regarding classification in level 706.

In this illustrative example, level 706 is a level that includes "divisions" for an organization, such as organization 106 shown in block form in FIG. 1. Each of plurality of nodes 716 represents a "division" organization unit, such as organization 106 shown in block form in FIG. 1. Each of plurality of nodes 716 represents a "division" within one of the "business areas" of plurality of nodes 714.

As depicted, levels 708 includes plurality of nodes 718. Each of plurality of nodes 718 is an example of one of plurality of nodes 400, shown in block form in FIG. 4. Each of plurality of nodes 718 includes metadata regarding classification in level 708.

In this illustrative example, level 708 is a level that includes "departments" for an organization, such as organization 106 shown in block form in FIG. 1. Each of plurality of nodes 718 represents a "department" organization unit, such as organization 106 shown in block form in FIG. 1. Each of plurality of nodes 718 represents a "department" within one of the "divisions" of plurality of nodes 716.

As depicted, levels 710 includes plurality of nodes 720. Each of plurality of nodes 720 is an example of one of plurality of nodes 400, shown in block form in FIG. 4. Each of plurality of nodes 720 includes metadata regarding classification in level 710.

In this illustrative example, level 710 is a level that includes "sub-departments" for an organization, such as organization 106 shown in block form in FIG. 1. Each of plurality of nodes 720 represents a "sub-department" organization unit, such as organization 106 shown in block form in FIG. 1. Each of plurality of nodes 728 represents a "sub department" within one of the "departments" of plurality of nodes 718.

As depicted, levels 712 includes plurality of nodes 722. Each of plurality of nodes 722 is an example of one of plurality of nodes 400, shown in block form in FIG. 4. Each of plurality of nodes 722 includes metadata regarding classification in level 712.

In this illustrative example, level 712 is a level that includes "teams" for an organization, such as organization 106 shown in block form in FIG. 1. Each of plurality of nodes 722 represents a "team" organization unit, such as organization 106 shown in block form in FIG. 1. Each of plurality of nodes 722 represents a "team" within one of the "sub-departments" of plurality of nodes 720.

Figure 8:
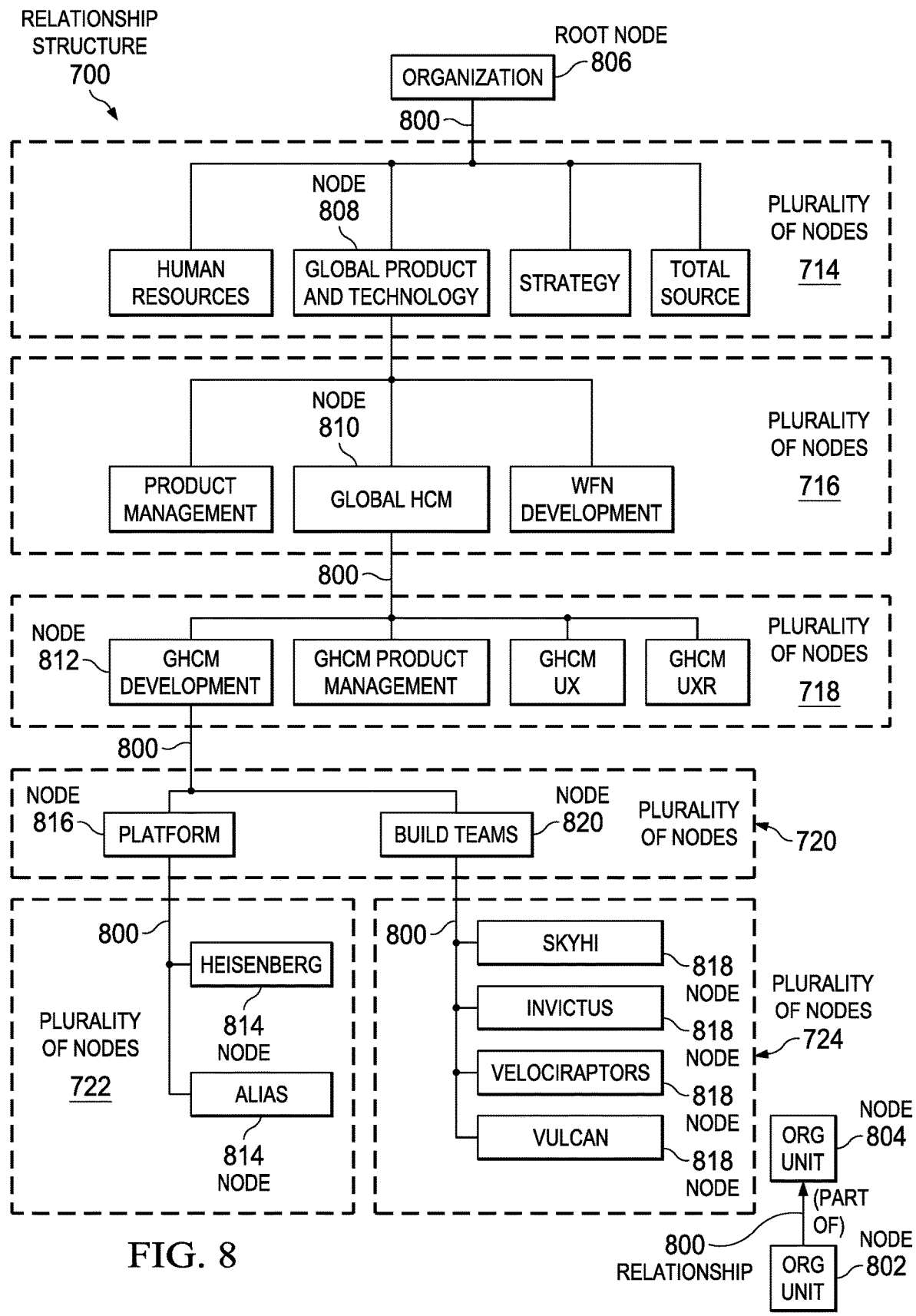
FIG. 8 is a schematic illustration of a first defined relationship depicted in accordance with an illustrative embodiment.

Turning now to FIG. 8, an illustration of a first defined relationship is depicted in accordance with an illustrative embodiment. In this illustrative example, relationship 800 illustrates a "part of" relationship between organization units, such as organization unit 104 shown in block form in FIG. 1. In this illustrative example, a configuration for relationship structure 700, such as configuration 136 shown in block form in FIG. 1, indicates that relationship 800 is a supported aspects, such as one of supported aspects 138 shown in block form in FIG. 1, of relationship structure 700.

In this illustrative example, relationship 800 illustrates a "part of" relationship within the context of relationship structure 700. In this illustrative example, relationship structure 700 is a human resources reporting structure.

In the context of a human resources reporting structure, "part of" relationship 800 indicates a reporting line between node 802 and node 804. The organization unit of node 802 is managed by, or reports to, the organization unit of node 804.

In this illustrative example, each entity, such as for example entity 124 shown in block form in FIG. 1, that is represented by one of plurality of nodes 714, plurality of nodes 716, plurality of nodes 718, plurality of nodes 720, plurality of nodes 722, or plurality of nodes 724 includes entity aspects that define a relationship for those nodes. The relationship can be, for example relationship 206 shown in block form in FIG. 2. Continuing with the current example, each entity, such as entity 124 shown in block form in FIG. 1, represented by one of plurality of nodes 714, plurality of nodes 716, plurality of nodes 718, plurality of nodes 720, plurality of nodes 722, or plurality of nodes 724, includes an entity aspect that indicates relationship 800.

As depicted, each of plurality of nodes 714 is related to root node 806 according to relationship 800. In this illustrative example, the organization units of plurality of nodes 714 are "part of" the organization unit of root node 806.

As depicted, each of plurality of nodes 716 is related to node 808 according to relationship 800. In this illustrative example, the organization units of plurality of nodes 716 are "part of" the organization unit of node 808.

As depicted, each of plurality of nodes 718 is related to node 810 according to relationship 800. In this illustrative example, the organization units of plurality of nodes 718 are "part of" the organization unit of node 810.

As depicted, each of plurality of nodes 720 is related to node 812 according to relationship 800. In this illustrative example, the organization units of plurality of nodes 720 are "part of" the organization unit of node 812.

As depicted, each of nodes 814 in plurality of nodes 722 is related to node 816 according to relationship 800. In this illustrative example, the organization units of nodes 814 are "part of" the organization unit of node 816.

As depicted, each of nodes 818 in plurality of nodes 724 is related to node 820 according to relationship 800. In this illustrative example, the organization units of nodes 818 are "part of" the organization unit of node 820.

Figure 9:
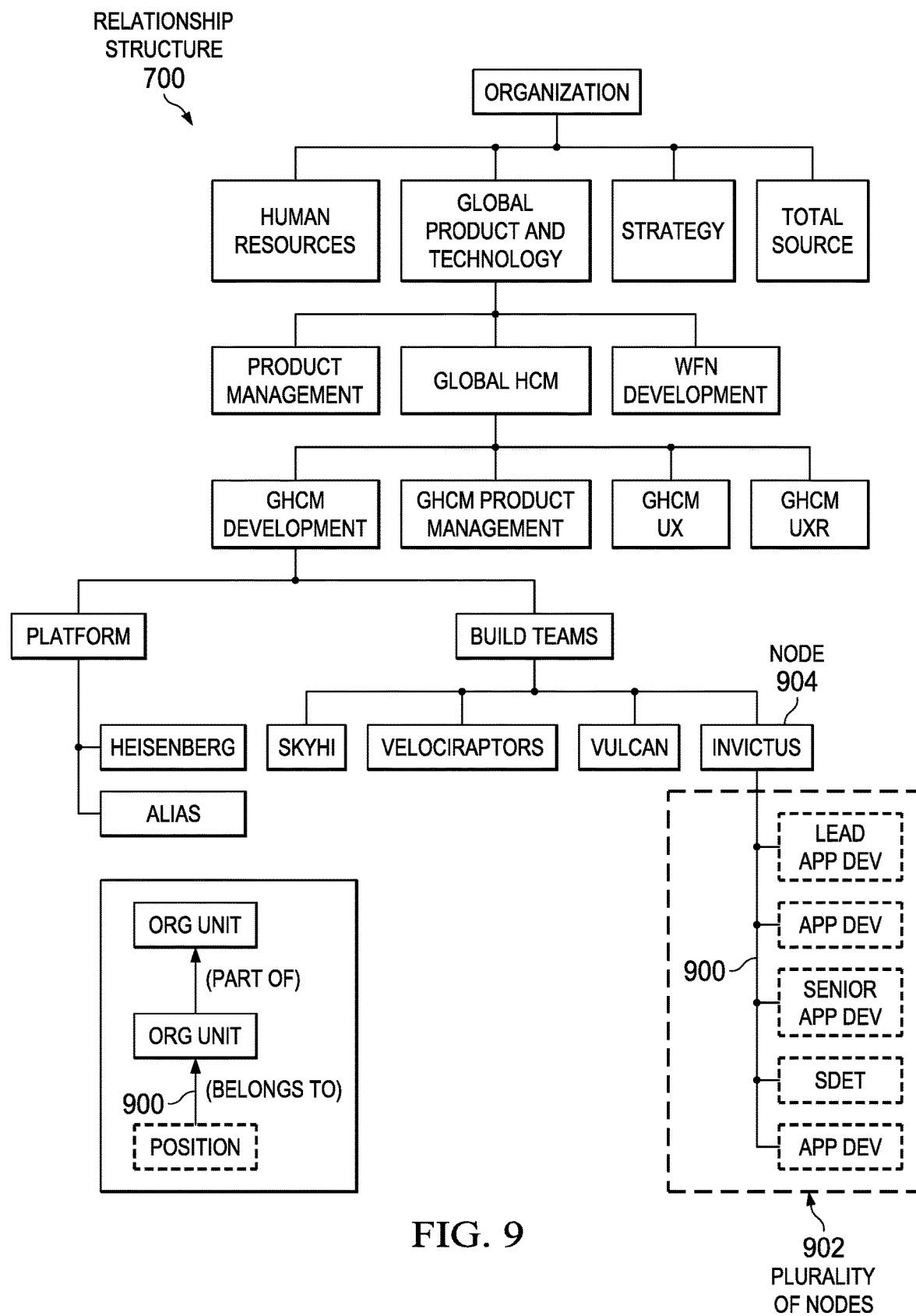
FIG. 9 is a schematic illustration of a second defined relationship depicted in accordance with an illustrative embodiment.

Turning now to FIG. 9, an illustration of a second defined relationship is depicted in accordance with an illustrative embodiment. In this illustrative example, relationship 900 illustrates a "belongs to" relationship between an organization unit, such as organization unit 104 shown in block form in FIG. 1, and a position in the organization unit. In this illustrative example, a configuration for relationship structure 700, such as configuration 136 shown in block form in FIG. 1, indicates that relationship 900 is a supported aspect, such as one of supported aspects 138 shown in block form in FIG. 1, of relationship structure 700.

In this illustrative example, relationship 900 illustrates a "belongs to" relationship within the context of relationship structure 700. In this illustrative example, relationship structure 700 is a human resources reporting structure.

In the context of a human resources reporting structure, "belongs to" relationship 900 defines primary reporting line between a position and an organization unit, such as one of organization unit 104 shown in block form in FIG. 1. The position can be a position within the organization held by a person, such as person 110 shown in block form in FIG. 1. In this illustrative example, access to information relevant to the position, such as information 114 shown in block form in FIG. 1, is granted based on relationship 900.

As depicted, each of plurality of nodes 902 is related to node 904 according to relationship 900. In this illustrative example, the positions of nodes 902 "belong to" the organization unit of node 904.

In this illustrative example, each entity, such as for example entity 124 shown in block form in FIG. 1, that is represented by one of plurality of nodes 902 includes entity aspects that define a relationship for those nodes. The relationship can be, for example relationship 206 shown in block form in FIG. 2. Continuing with the current example, each entity represented by one of plurality of nodes 902 includes an entity aspect that indicates relationship 900.

Figure 10:
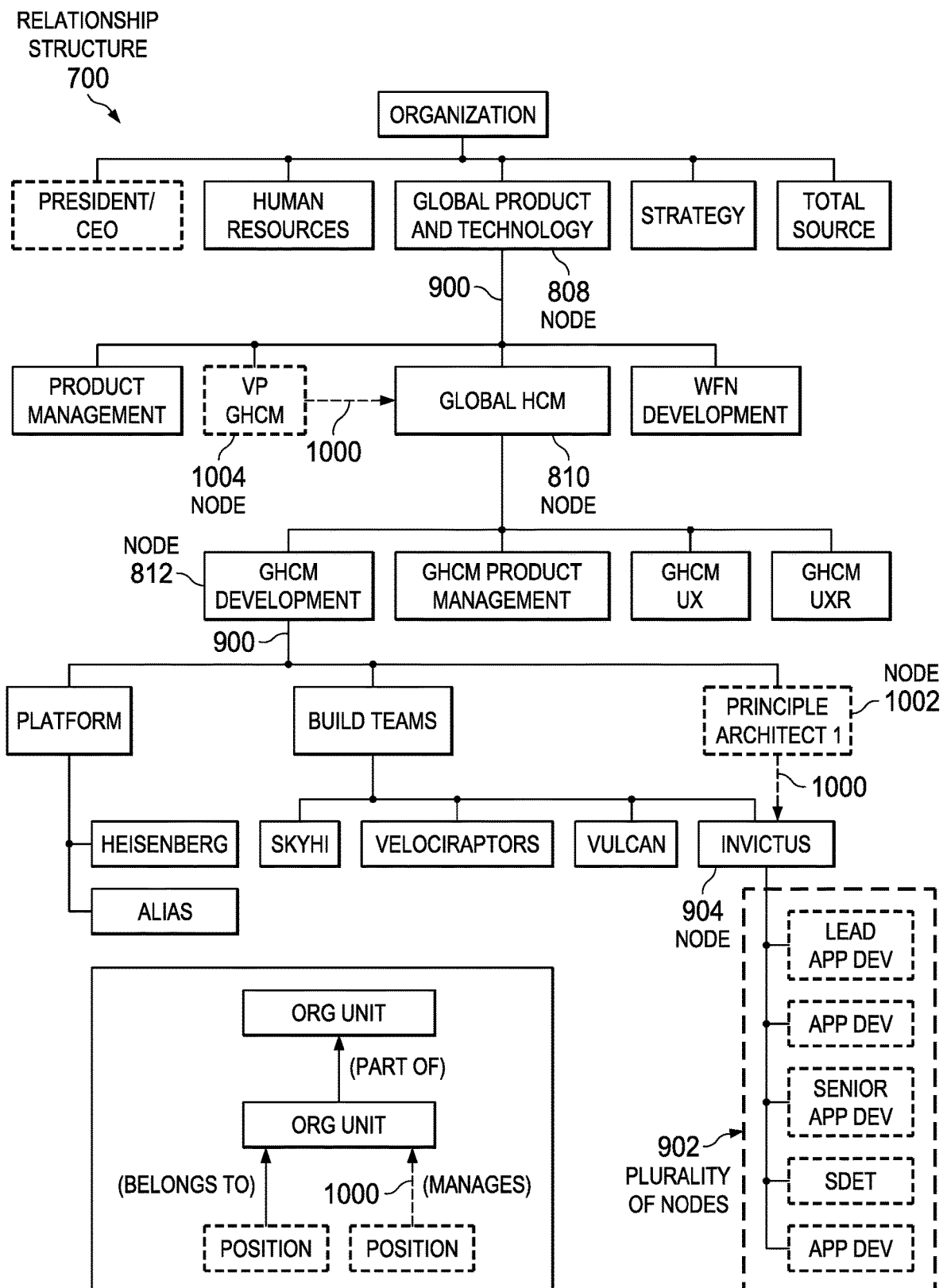
FIG. 10 is a schematic illustration of a third defined relationship depicted in accordance with an illustrative embodiment.

Turning now to FIG. 10, an illustration of a third defined relationship is depicted in accordance with an illustrative embodiment. In this illustrative example, relationship 1000 illustrates a "manages" relationship between an organization unit, such as organization unit 104 shown in block form in FIG. 1, and a position in the organization. In this illustrative example, a configuration for relationship structure 700, such as configuration 136 shown in block form in FIG. 1, indicates that relationship 1000 is a supported aspect, such as one of supported aspects 138 shown in block form in FIG. 1, of relationship structure 700.

In this illustrative example, relationship 1000 illustrates a "manages" relationship within the context of relationship structure 700. In this illustrative example, relationship structure 700 is a human resources reporting structure.

In the context of human resources reporting structure, "manages" relationship 1000 provides visibility and authoritative power over managed organization units and positions that "belong to" the managed organization unit.

As depicted, node 1002 is related to node 904 according to relationship 1000. In this illustrative example, the positions of node 1002 "manages" the organization unit of node 904, as well as the positions of plurality of nodes 902.

As depicted, node 1004 is related to node 810 according to relationship 1000. In this illustrative example, the positions of nodes 1004 "manages" the organization unit of node 810.

In one illustrative example, managing positions "belong to" an organization unit at least one level, such as one of plurality of levels 702 of FIG. 7, up from the managed organization unit. As depicted, node 1002 "belongs to" node 812 according to relationship 900. Node 812 resides in level 708, shown in FIG. 7. Positions for plurality of nodes 902 "belong to" node 904. Node 904 resides in level 712, shown in FIG. 7. As depicted, node 1004 "belongs to" node 808 according to relationship 900. Node 808 resides in level 704, shown in FIG. 7. Positions for plurality of nodes 902 "belong to" node 904. Node 904 resides in level 706, shown in FIG. 7.

In this illustrative example, each entity, such as for example entity 124 shown in block form in FIG. 1, that is represented by node 1002 and 1004 includes entity aspects that define a relationship for those nodes. The relationship can be, for example relationship 206 shown in block form in FIG. 2. Continuing with the current example, each entity represented by one of node 1002 and node 1004 includes an entity aspect that indicates relationship 1000.

Figure 11:
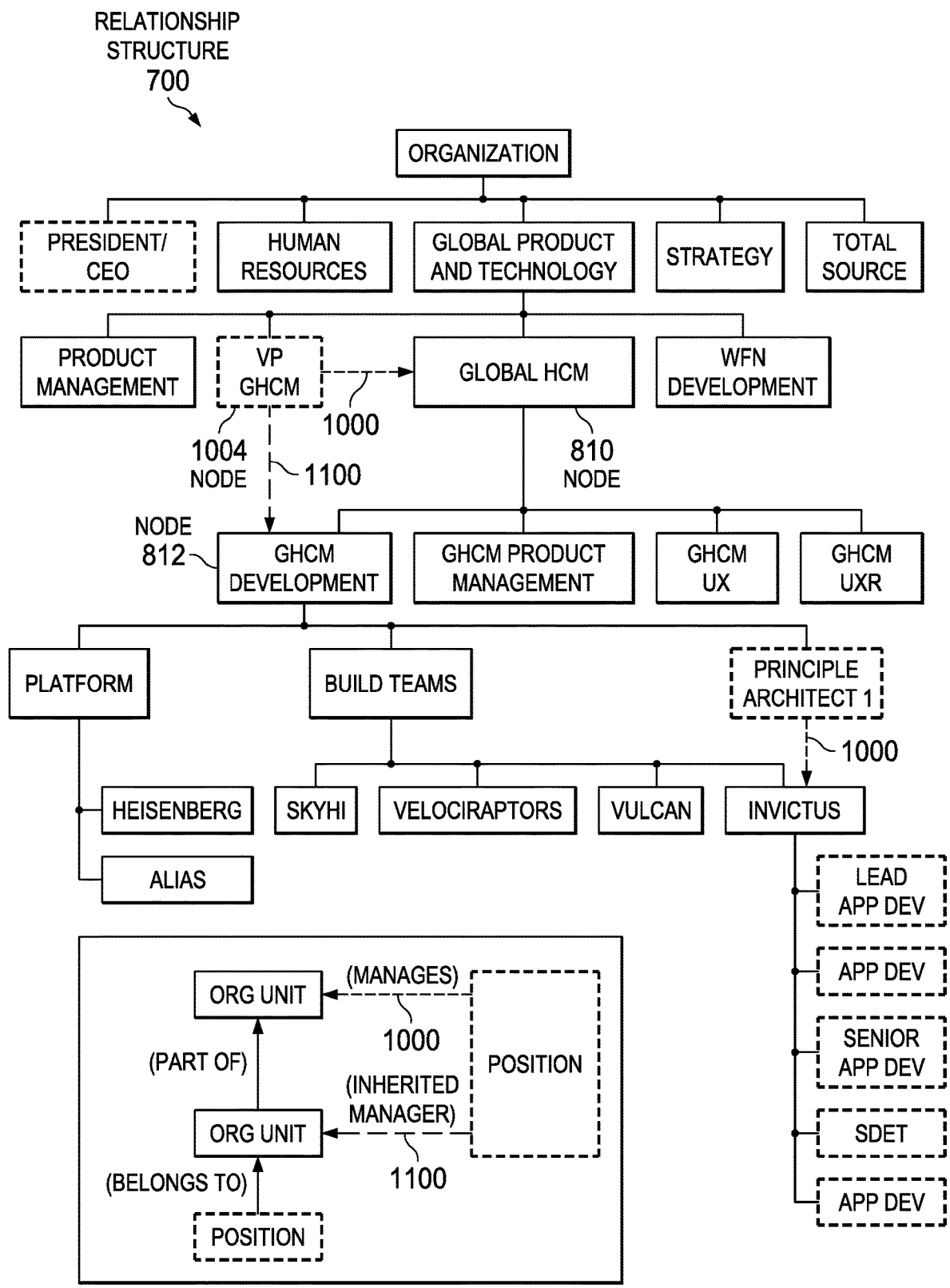
FIG. 11 is a schematic illustration of an inherited third relationship depicted in accordance with an illustrative embodiment.

Turning to FIG. 11, an illustration of an inherited third relationship is depicted in accordance with an illustrative embodiment. In this illustrative example, relationship 1100 illustrates an "inherited managing" relationship between an organization unit, such as organization unit 104, shown in block form in FIG. 1, and a position in the organization.

In an illustrative example, when a particular organization unit does not have a manager directly assigned, the manager is inherited based on the parent organization unit. When one illustrative example, an "inherited manager" relationship 1100 in relationship structure 700 can be triggered when an organization unit does not have a management position, or when the managing position is vacant. In either case, the relationship modeler, such as relationship modeler 122 shown in block form in FIG. 1, traverses relationship structure 700 and assigns the first non-vacant managing position of a parent organization unit according to relationship 1100.

In this illustrative example, node 1004 is related to node 810 according to relationship 1000. In this illustrative example, the positions of nodes 1004 "manages" the organization unit of node 810. In this illustrative example, a configuration for relationship structure 700, such as configuration 136 shown in block form in FIG. 1, indicates that relationship 1000 is a supported aspect, such as one of supported aspects 138 shown in block form in FIG. 1, of relationship structure 700.

Continuing with the current example, the organization unit of 812 does not have a specified manager. Relationship modeler 122, shown in block form in FIG. 1, traverses relationship structure 700 and attaches node 1004 to node 812 according to relationship 1100.

Figure 12:
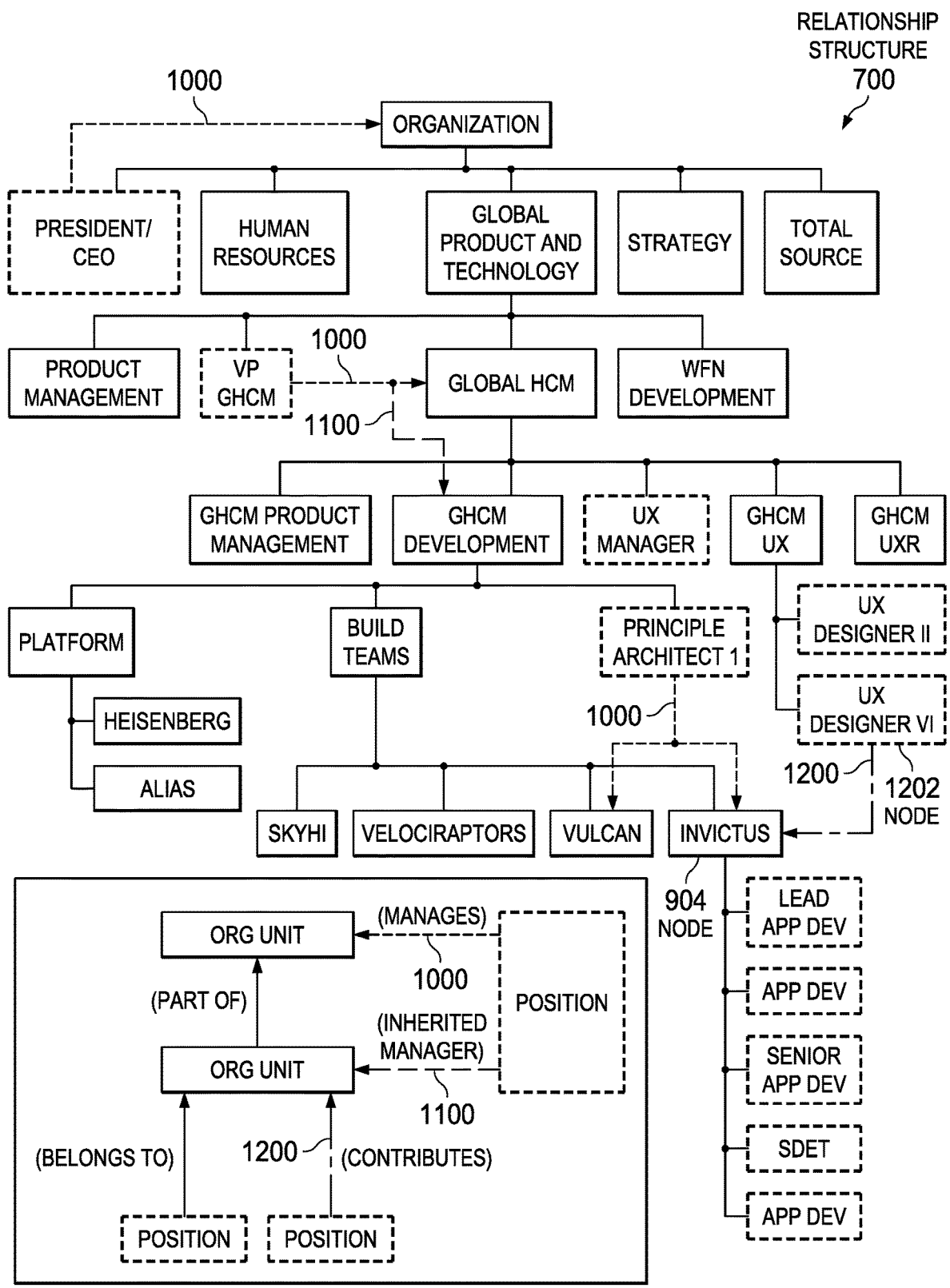
FIG. 12 is a schematic illustration of a fourth defined relationship depicted in accordance with an illustrative embodiment.

Turning now to FIG. 12, an illustration of a fourth defined relationship as depicted in accordance with an illustrative embodiment. In this illustrative example, relationship 1200 indicates a "contributes" relationship between an organization unit, such as organization unit 104 shown in block form in FIG. 1, and a position in the organization. In this illustrative example, a configuration for relationship structure 700, such as configuration 136 shown in block form in FIG. 1, indicates that relationship 1200 is a supported aspect, such as one of supported aspects 138 shown in block form in FIG. 1, of relationship structure 700.

In this illustrative example, relationship 1200 illustrates a "contributes" relationship within the context of relations structure 700. In this illustrative example, relationship structure 700 is a human resources reporting structure.

In the context of a human resources reporting structure, relationship 1200 provides visibility on fixed collaboration between positions that "belong to" different organization unit according to relationship 900, as shown in FIG. 9, but which has no authority over the related organization unit.

In this illustrative example, node 1202 is related to node 904 according to relationship 1200. In this illustrative example, the position of node 1202 "contributes to" the organization unit of node 904.

In this illustrative example, each entity, such as for example entity 124 shown in block form in FIG. 1, that is represented by node 1202 includes entity aspects that define a relationship for those nodes. The relationship can be, for example relationship 206 shown in block form in FIG. 2. Continuing with the current example, each entity represented by node 1202 includes an entity aspect that indicates relationship 1200.

Figure 13:
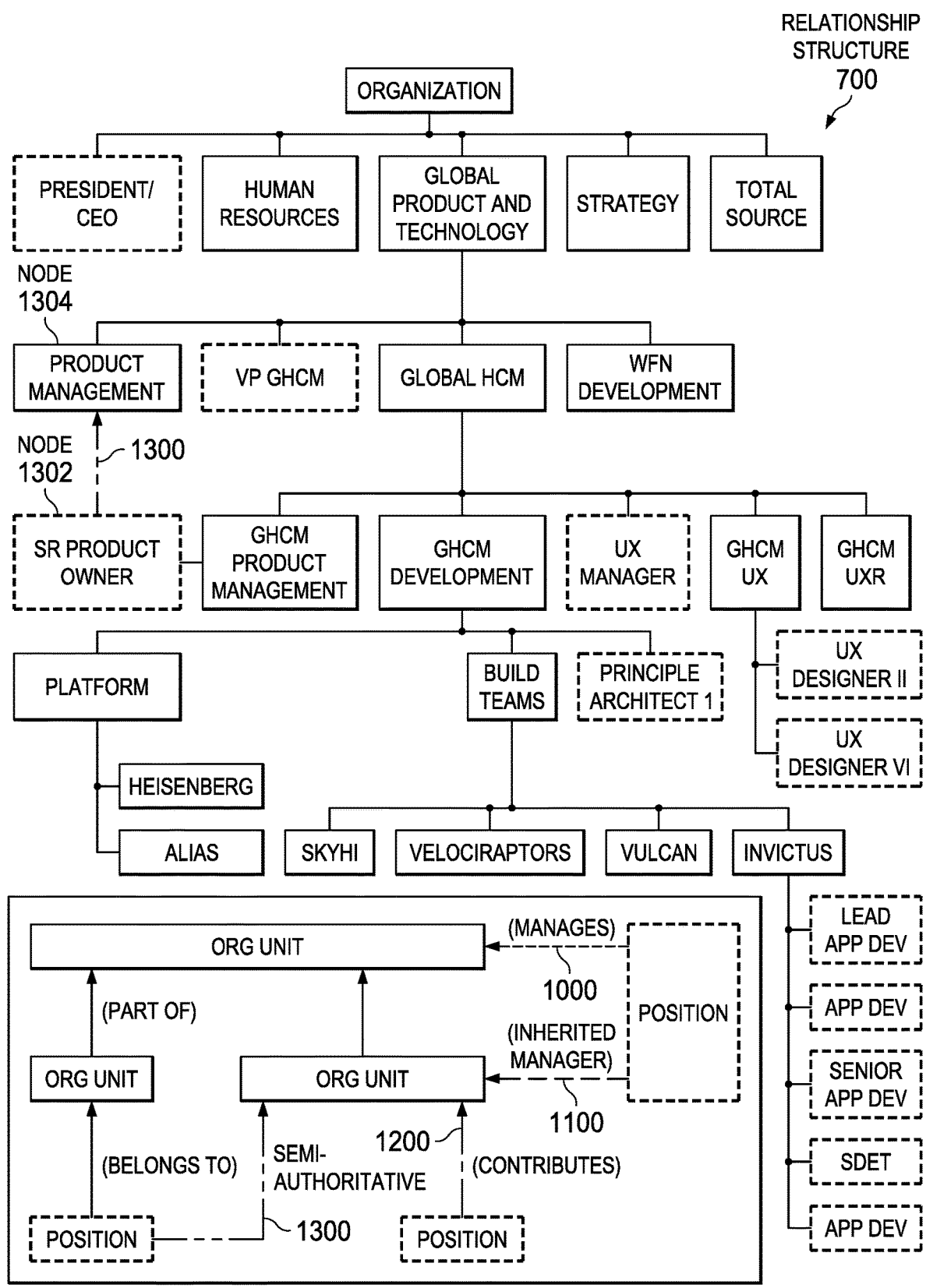
FIG. 13 is a schematic illustration of a fifth defined relationship depicted in accordance with an illustrative embodiment.

Turning now to FIG. 13, an illustration of a fifth defined relationship is depicted in accordance with an illustrative embodiment. In this illustrative example, relationship 1300 indicates a "semi-authoritative" relationship between an organization unit, such as organization unit 104 shown in block form in FIG. 1, and a position in the organization. In this illustrative example, a configuration for relationship structure 700, such as configuration 136 shown in block form in FIG. 1, indicates that relationship 1300 is a supported aspect, such as one of supported aspects 138 shown in block form in FIG. 1, of relationship structure 700.

In this illustrative example, relationship 1300 illustrates a "semi-authoritative" relationship within the context of relations structure 700. In this illustrative example, relationship structure 700 is a human resources reporting structure.

In the context of a human resources reporting structure, relationship 1300 implies a partial managerial or authoritative assignment between a position in an organization unit. Accordingly, relationship 1300 may imply a secondary manager relationship. Typically, a position related by relationship 1300 drives deliverables or work assigned to the related entity.

In this illustrative example, node 1302 is related to node 1304 according to relationship 1300. In this illustrative example, the position of node 1302 has a "semi-authoritative" relationship to the organization unit of node 1304.

In this illustrative example, each entity, such as for example entity 124 shown in block form in FIG. 1, that is represented by node 1302 includes entity aspects that define a relationship for those nodes. The relationship can be, for example relationship 206 shown in block form in FIG. 2. Continuing with the current example, each entity represented by node 1302 includes an entity aspect that indicates relationship 1300.

Figure 14:
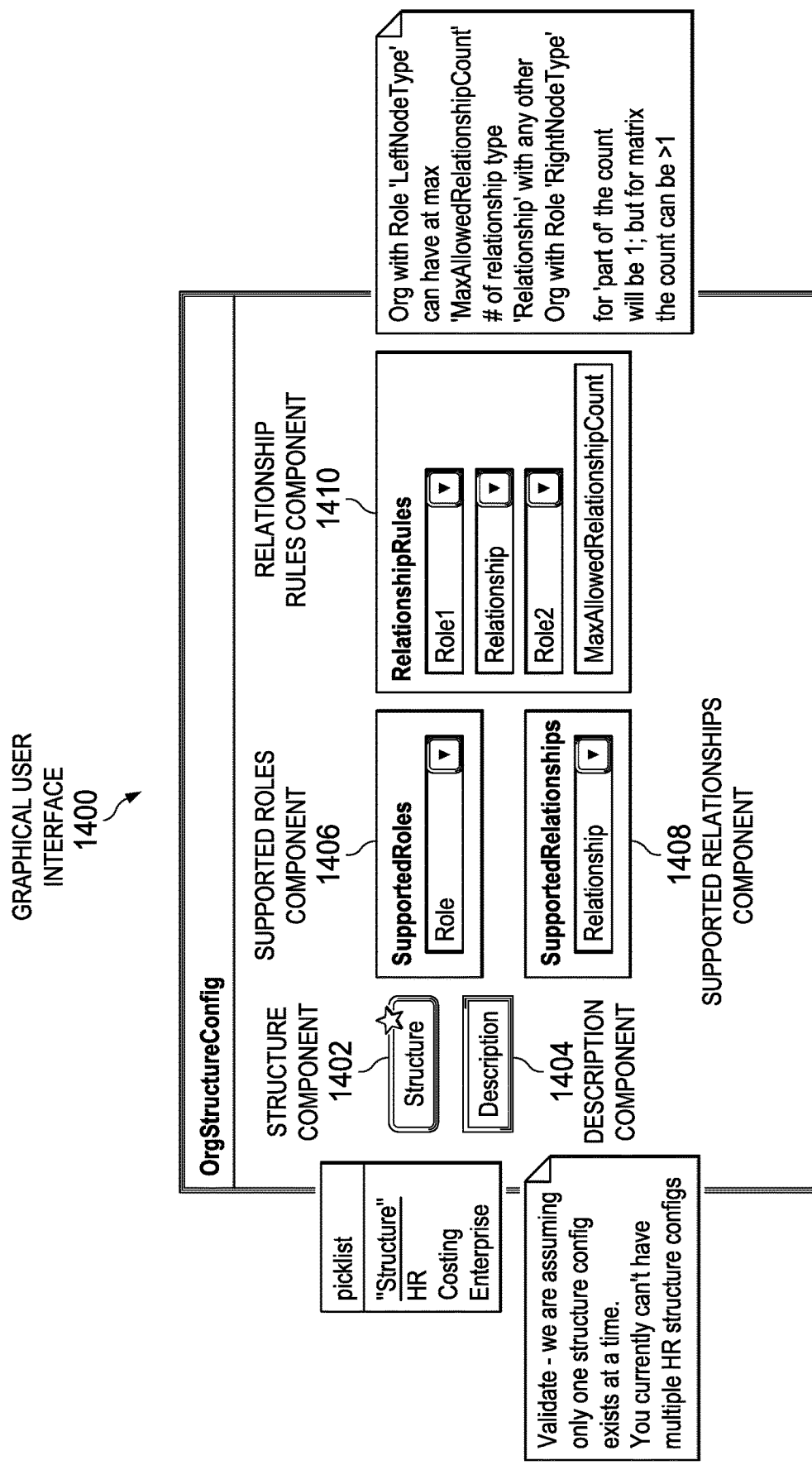
FIG. 14 is an illustration of a graphical user interface for configuring a relationship structure depicted in accordance with an illustrative embodiment.

With reference now to FIG. 14, an illustration of a graphical user interface for configuring a relationship structure is shown according to an illustrative embodiment. Graphical user interface 1400 is an example of a graphical user interface 144, shown in block form in FIG. 1. As depicted, graphical user interface 1400 can be used to define configuration 136, shown in block form in FIG. 1, for a relationship structure, such as relationship structure 130, shown in block form in FIG. 1.

As depicted, graphical user interface 1400 includes a number of graphical components for indicating supported aspects, such as supported aspects 138 shown in block form in FIG. 1, of a relationship structure. As depicted, graphical user interface 1400 includes structure component 1402, description component 1404, supported roles component 1406, supported relationships component 1408, and relationship rules component 1410.

Structure component 1402 is a graphical element within graphical user interface 1400 that defines a context for a configured relationship structure. In one illustrative example, structure component 1402 is implemented as a dynamic pick list. A dynamic pick allows an operator, such as operator 142, shown in block form in FIG. 1, to dynamically add values to structure component 1402 at runtime. When implemented as a dynamic pick list, structure component 1402 allows configuration data to be stored as platform end metadata, instead of system of record data. By storing configuration data as metadata, relationship modeler 122, shown in block form in FIG. 1, can compare specific structure values in a more controlled manner.

In one illustrative example, structure component 1402 includes a number of default context for relationship structures. In one illustrative example, the default context can include at least one of a human resources reporting structure, a costing structure, and a legal entity structure.

Description component 1404 is a graphical element within graphical user interface 1400 that allows operator 142, shown in block form in FIG. 1, to enter additional descriptive information for a configured relationship structure. In one illustrative embodiment, description component 1404 is locally coupled to structure component 1402. By coupling description component 1404 to structure component 1402, additional fields can be added to structure component 1402 that define additional contexts for relationship structures, thereby extending the functionality of the dynamic pick list.

Supported roles component 1406 is a graphical element within graphical user interface 1400 that lists roles that are allowed for a set of entities, such as separate entities 126 shown in block form in FIG. 1, within the context of a relationship structure indicated by structure component 1402. In one illustrative example, supported roles component 1406 provides a list of all roles that can apply to an entity, such as entity 124 shown in block form in FIG. 1, within the context of a relationship structure indicated by structure component 1402.

In one illustrative example, supported roles component 1406 is implemented as a dynamic pick list. A dynamic pick allows an operator, such as operator 142, shown in block form in FIG. 1, to dynamically add values to supported roles component 1406 at runtime. When implemented as a dynamic pick list, supported roles component 1406 allows configuration data to be stored as platform end metadata, instead of system of record data. By storing configuration data as metadata, relationship modeler 122, shown in block form in FIG. 1, can compare specific relationship values in a more controlled manner.

In one illustrative example, supported roles component 1406 includes a number of default roles can be selected according to the context of a relationship structure indicated by structure component 1402. In one illustrative example, a human resources structure context is indicated by structure component 1402. In this illustrative example, default roles within supported roles component 1406 can include an organization unit, a business unit, a division, a Department, a sub department, a team, and other suitable roles within the context of a human resources structure.

In yet another illustrative example, a legal entity context is indicated by structure component 1402. In this illustrative example, default roles within supported roles component 1406 can include a company code, a legal entity, a global ultimate, a domestic ultimate, and other suitable roles within the context of a legal entity structure.

In yet another illustrative example, a costing structure context is indicated by structure component 1402. In this illustrative example, default roles within supported roles component 1406 can include a costing group, a cost center, and other suitable roles within the context of a costing structure.

In yet another illustrative example, a client context is indicated by structure component 1402. In this illustrative example, default roles within supported roles component 1406 can include a head, a subhead, and other suitable roles within the context of a client relationship structure.

Supported relationships component 1408 is a graphical element within graphical user interface 1400 that identifies relationships that are allowed between a set of entities, such as separate entities 126 shown in block form in FIG. 1, within the context of a relationship structure indicated by structure component 1402. In one illustrative example, supported relationships component 1408 provides a list of all relationships that can apply among a set of entities, such as set of entities 126 shown in block form in FIG. 1, within the context of a relationship structure indicated by structure component 1402.

In one illustrative example, supported relationships component 1408 is implemented as a dynamic pick list. A dynamic pick allows an operator, such as operator 142, shown in block form in FIG. 1, to dynamically add values to supported relationships component 1408 at runtime. When implemented as a dynamic pick list, supported relationships component 1408 allows relationship data to be stored as platform end metadata, instead of system of record data. By storing relationship data as metadata, relationship modeler 122, shown in block form in FIG. 1, can compare specific relationship values in a more controlled manner.

In one illustrative example, supported roles component 1406 includes a number of default relationships can be selected according to the context of a relationship structure indicated by structure component 1402. In one illustrative example, the default relationships can include at least one of relationship 800, relationship 900, relationship 1000, relationship 1100, relationship 1200, and relationship 1300, as illustrated in FIGS. 8-13.

Relationship rules component 1410 is a graphical element within graphical user interface 1400 define which of supported relationships selected by supported relationships component 1408 can be applied to a particular entity, such as entity 124 shown in block form in FIG. 1, based on a role defined for the entity. In one illustrative example, relationship rules component 1410 includes one or more rules that define which of set of entities 126, shown in block form in FIG. 1, can be attached other entities based on supported relationships indicated by supported relationships component 1408 and the roles of those entities within a context indicated by structure component 1402. In one illustrative example, relationship rules component 1410 includes one or more rules that define a maximum number of allowed relationships for an entity, such as entity 124 shown in block form in FIG. 1, based on a role of the entity within a context indicated by structure component 1402.

Figure 15:
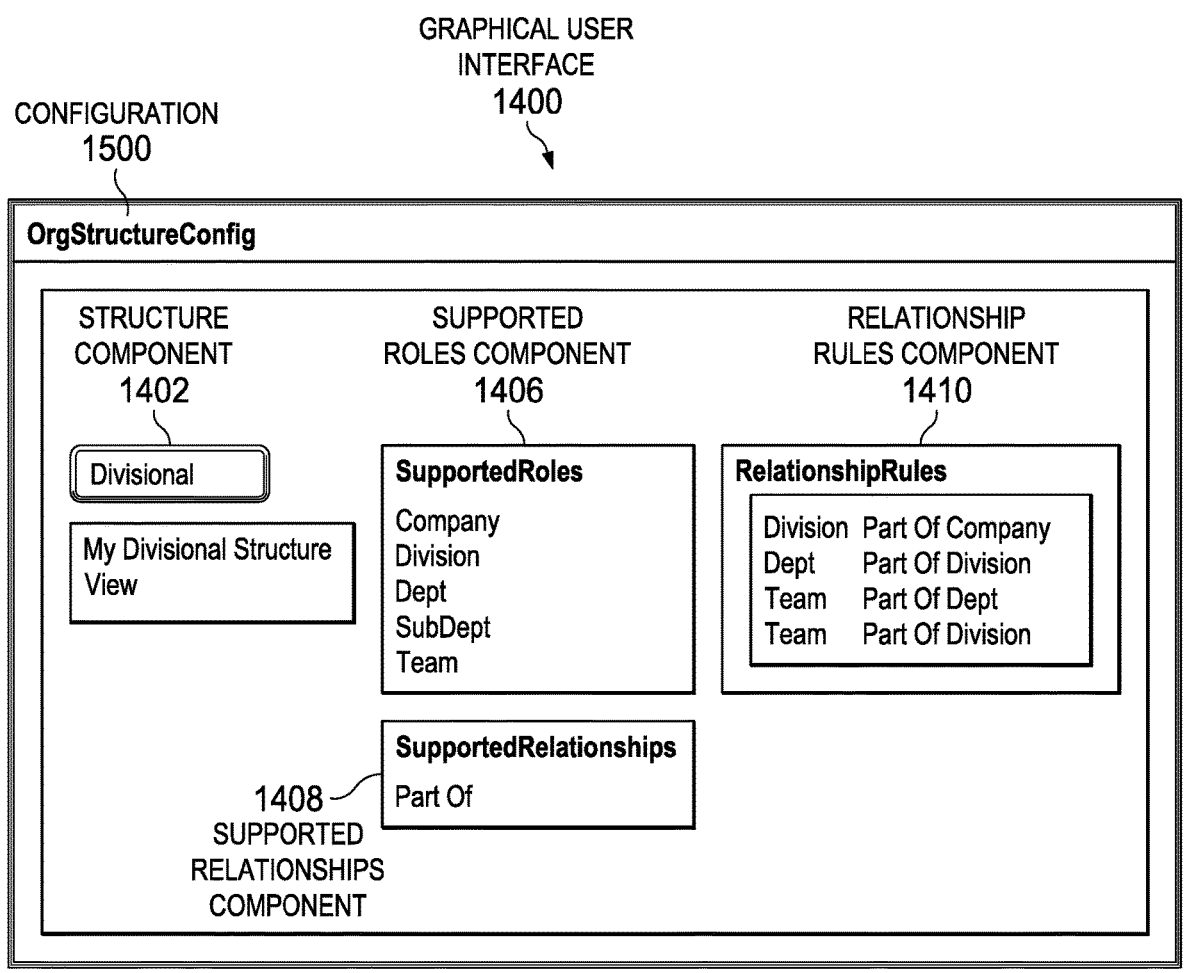
FIG. 15 is an example of a first configuration illustrated within a graphical user interface for configuring a relationship structure in accordance with an illustrative embodiment.

Referring now to FIG. 15, an example of a first configuration within graphical user interface 1400 for a relationship structure is shown according to an illustrative example. As depicted, configuration 1500 is a configuration for a human resources reporting structure, as selected from structure component 1402.

Configuration 1500 supports a number of roles for entities within the context of configuration 1500. As indicated in supported roles component 1406, configuration 1500 supports the roles of root in the organization unit.

Configuration 1500 supports a number of relationships for entities within the context of configuration 1500. As indicated in supported relationships component 1408, configuration 1500 supports a "part of" relationship, as illustrated in FIG. 8.

Configuration 1500 includes a number of relationship rules indicating how entities may be attached within the context of configuration 1500. As indicated in relationship rules component 1410, configuration 1500 includes a relationship rule that an entity may be related to a root according to relationship 800, as illustrated in FIG. 8. configuration 1500 also includes a relationship rule that an entity may be related to another entity according to relationship 800, as illustrated in FIG. 8.

Figure 16:
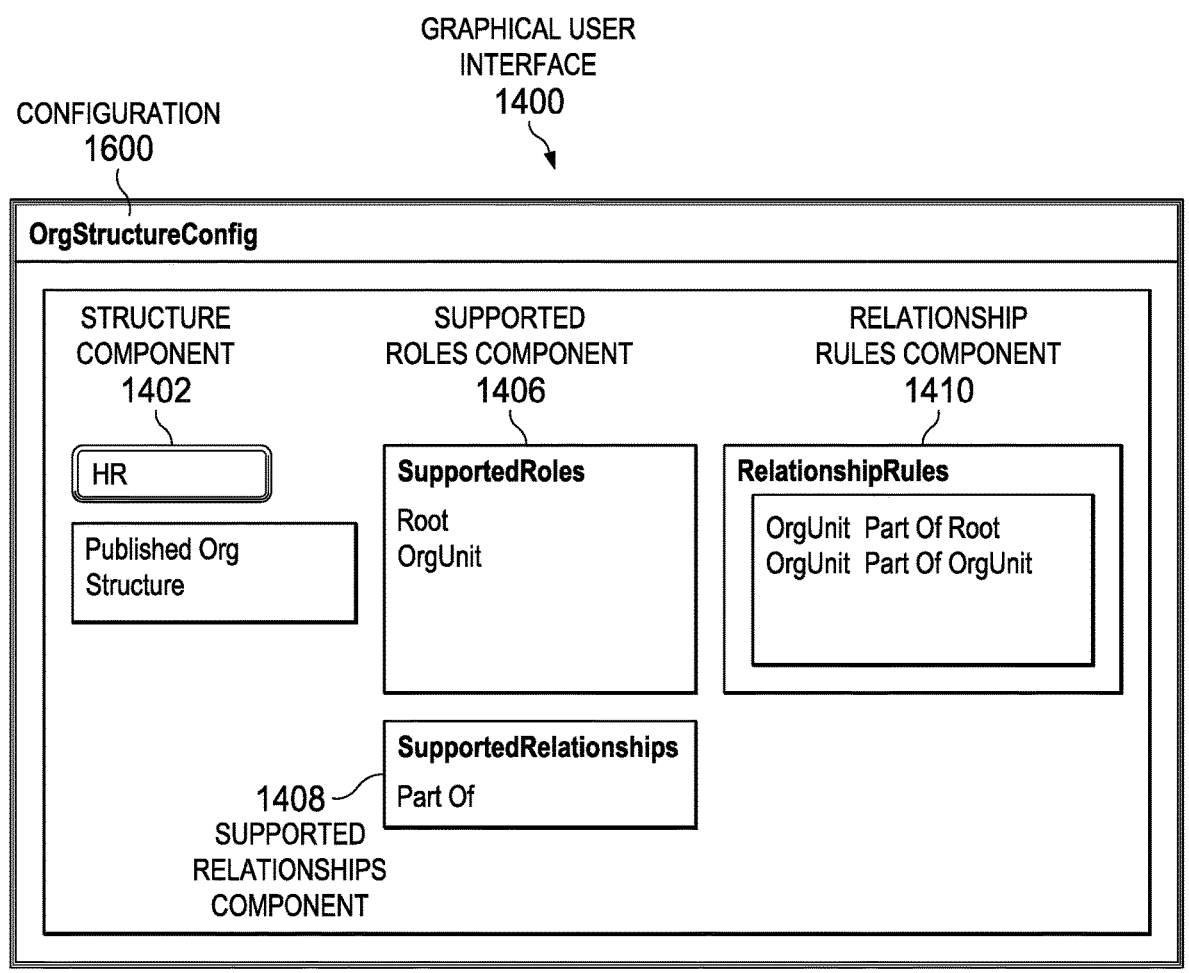
FIG. 16 is an example of a second configuration illustrated within a graphical user interface for configuring a relationship structure in accordance with an illustrative embodiment.

Referring now to FIG. 16, an example of a second configuration within graphical user interface 1400 for a relationship structure is shown according to illustrative example. As depicted, configuration 1600 is a configuration for a user-defined divisional structure. In this illustrative example, and operators, such as operator 142, shown in block form in FIG. 1, adds a context for divisional structure during runtime to a dynamic pick list implemented as structure component 1402.

As indicated in supported roles component 1406, configuration 1600 supports the roles of company, a division, department, sub department, and team.

Configuration 1600 supports a number of relationships for entities within the context of configuration 1600. As indicated in supported relationships component 1408, configuration 1600 supports a "part of" relationship, as illustrated in FIG. 8.

Configuration 1600 includes a number of relationship rules indicating how entities may be attached within the context of configuration 1600. As indicated in relationship rules component 1410, configuration 1600 includes a first relationship rule that an entity having the role of "division" is related to an entity having the role of "company" according to relationship 800, as illustrated in FIG. 8. configuration 1600 includes a second relationship rule that an entity having the role of "department" is related to an entity having the role of "division" according to relationship 800, as illustrated in FIG. 8. Configuration 1600 includes a third relationship rule that an entity having the role of "team" is related to an entity having the role of "department" according to relationship 800, as illustrated in FIG. 8. Configuration 1600 includes a fourth relationship rule that an entity having the role of "team" is related to an entity having the role of "division" according to relationship 800, as illustrated in FIG. 8.

Figure 17:
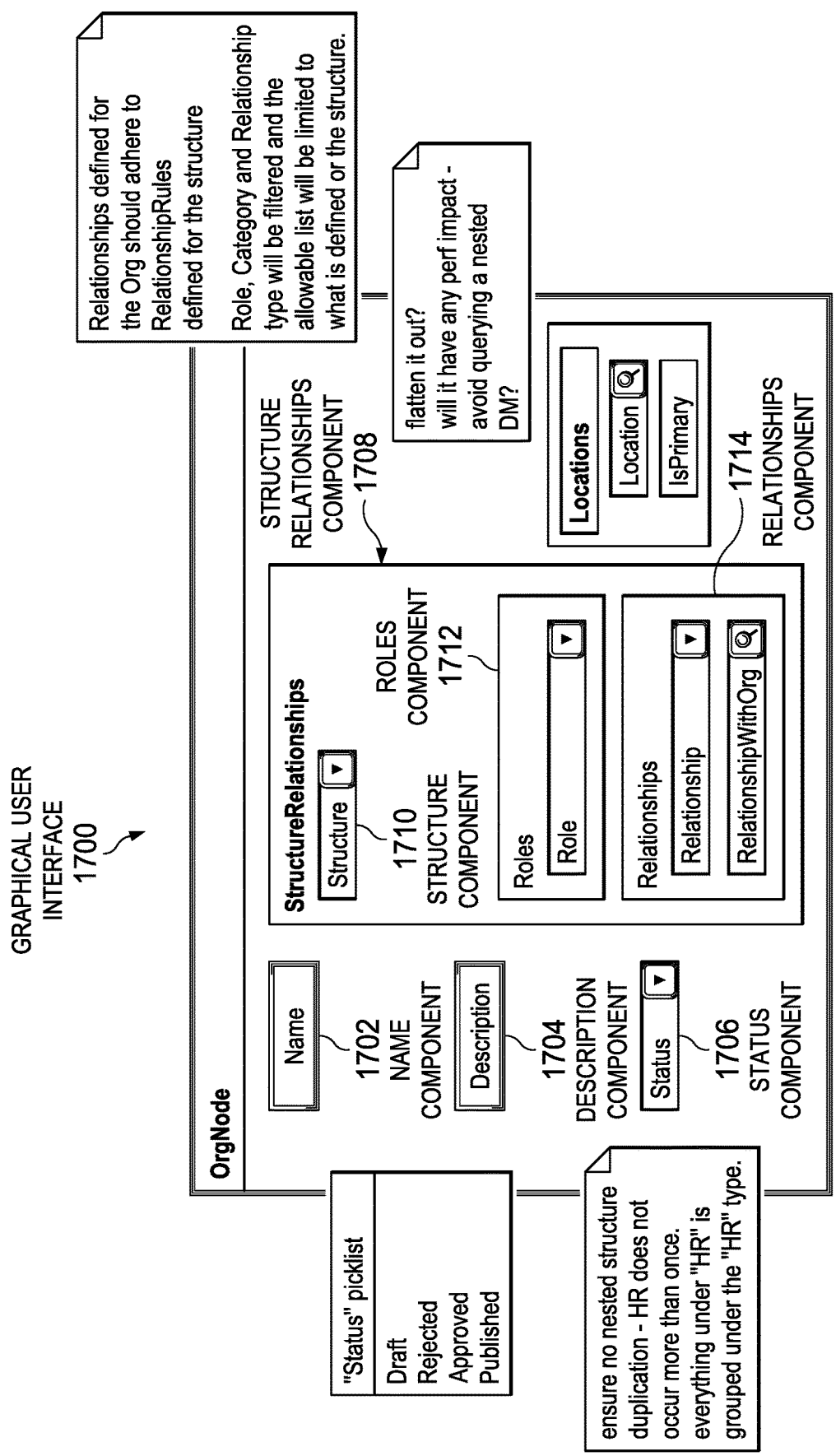
FIG. 17 is a an illustration of a graphical user interface for constructing an entity depicted in accordance with an illustrative embodiment.

Referring now to FIG. 17, an illustration of a graphical user interface for constructing an entity is shown according to an illustrative embodiment. Graphical user interface 1700 is an example of a graphical user interface 144, shown in block form in FIG. 1. As depicted, graphical user interface 1700 can be used to define entity aspects 134 for entity 124, both shown in block form in FIG. 1.

As depicted, graphical user interface 1700 includes a number of graphical components for indicating entity aspects, such as entity aspects 134 shown in block form in FIG. 1. As depicted, graphical user interface 1700 includes name component 1702, description component 1704, status component 1706, and structure relationships component 1708.

Name component 1702 is a graphical element within graphical user interface 1700 that allows operator 142, shown in block form in FIG. 1, to enter a descriptive name for an entity, such as entity 124 shown in block form in FIG. 1. In this illustrative example, data entered into name component 1702 is stored as one of attributes 202 for entity 124, both shown in block form in FIG. 2.

Description component 1704 is a graphical element within graphical user interface 1700 that allows operator 142, shown in block form in FIG. 1, to enter additional descriptive information describing an entity, such as entity 124 shown in block form in FIG. 1. In this illustrative example, data entered into description component 1704 is stored as one of attributes 202 for entity 124, both shown in block form in FIG. 2.

Status component 1706 is a graphical element within graphical user interface 1700 that with a status for an entity constructed according to graphical user interface 1700. In one illustrative example, status component 1706 provides a list of all status that can apply to an entity In one illustrative example, status component 1706 is implemented as a dynamic picklist. The dynamic picklist allows an operator, such as operator 142, shown in block form in FIG. 1, to dynamically add values to status component 1706 at runtime. In one illustrative example, status component 1706 includes a number of default statuses that can be selected. In one illustrative example, an operator can select a status for the associated entity from the default statuses of draft, rejected, approved, and published.

Structure relationships component 1708 is a graphical element within graphical user phase 1700 that allows operator 142, shown in block form in FIG. 1, to indicate roles and relationships that are allowed for the constructed entity within a particular relationship context. As depicted, structure relationships component 1708 includes a number of different components. As depicted, structure relationships component 1708 includes structure component 1710, roles component 1712, and relationships component 1714.

Structure component 1710 is a graphical element within graphical user interface 1700 that defines a context for applying particular roles and relationships to the constructed entity. In one illustrative example, structure component 1710 is implemented as a dynamic pick list. A dynamic pick allows an operator, such as operator 142, shown in block form in FIG. 1, to dynamically add values to structure component 1710 at runtime. When implemented as a dynamic pick list, structure component 1710 allows configuration data to be stored as platform end metadata, instead of system of record data. By storing configuration data as metadata, relationship modeler 122, shown in block form in FIG. 1, can compare specific structure values for the constructed entity, such as entity 124 shown in block in FIG. 1 in a more controlled manner.

In one illustrative example, structure component 1710 includes a number of default context. In one illustrative example, the default context of structure component 1710 correspond to default context of structure component 1402 of FIG. 14. In one illustrative example, the default context can include at least one of a human roles within roles component resources reporting structure, a costing structure, and a legal entity structure.

Roles component 1712 is a graphical element within graphical user interface 1700 that lists roles that are allowed for the constructed entity within the context of a relationship structure indicated by structure component 1710. In one illustrative example, roles component 1712 provides a list of all roles that can apply to an entity, such as entity 124 shown in block form in FIG. 1, within the context of a relationship structure indicated by structure component 1710. In this illustrative example, data entered into roles component 1712 is stored as role 204 for entity 124, both shown in block form in FIG. 2.

In one illustrative example, roles component 1712 is implemented as a dynamic pick list. A dynamic pick allows an operator, such as operator 142, shown in block form in FIG. 1, to dynamically add values to supported roles component 1712 at runtime. When implemented as a dynamic pick list, roles component 1712 allows data to be stored as platform end metadata, instead of system of record data. By storing data as metadata, relationship modeler 122, shown in block form in FIG. 1, can compare specific role values in a more controlled manner.

In one illustrative example, roles component 1712 includes a number of default roles can be selected according to the context of a relationship structure indicated by structure component 1710. In one illustrative example, in the context of a human resources structure, default roles within roles component 1712 can include an organization unit, a business unit, a division, a Department, a sub department, a team, and other suitable roles within the context of a human resources structure.

In another illustrative example, in the context of a legal entity structure indicated by structure component 1710, default roles within roles component 1712 can include a company code, a legal entity, a global ultimate, a domestic ultimate, and other suitable roles within the context of a legal entity structure. In yet another illustrative example, in the context of a costing structure indicated by structure component 1710, default roles within roles component 1712 can include a costing group, a cost center, and other suitable roles within the context of a costing structure. In yet another illustrative example, when the context of a client structure indicated by structure component 1710, default roles within roles component 1712 can include a head, a subhead, and other suitable roles within the context of a client relationship structure.

Relationships component 1714 is a graphical element within graphical user interface 1700 that identifies relationships that indicates allowable relationships for the constructed entity within the context of a relationship structure indicated by structure component 1710. In one illustrative example, relationships component 1714 provides a list of all relationships that can apply to the constructed entity, such entity 124 shown in block form in FIG. 1, within the context of a relationship structure indicated by structure component in 710. In this illustrative example, data entered into roles component 1712 is stored as relationship 206 for entity 124, both shown in block form in FIG. 2.

In one illustrative example, relationships component 1714 is implemented as a dynamic pick list. A dynamic pick allows an operator, such as operator 142, shown in block form in FIG. 1, to dynamically add values to relationships component 1714 at runtime. When implemented as a dynamic pick list, relationships component 1714 allows relationship data to be stored as platform end metadata, instead of system of record data. By storing relationship data as metadata, relationship modeler 122, shown in block form in FIG. 1, can compare specific relationship values for set, shown in block form in FIG. 1, shown in block form in FIG. 1, in a more controlled manner.

In one illustrative example, relationship component 1714 includes a number of default relationships can be selected according to the context of a relationship structure indicated by structure component 1710. In one illustrative example, the default relationships can include at least one of relationship 800, relationship 900, relationship 1000, relationship 1100, relationship 1200, and relationship 1300, as illustrated in FIGS. 8-13.

Figure 18:
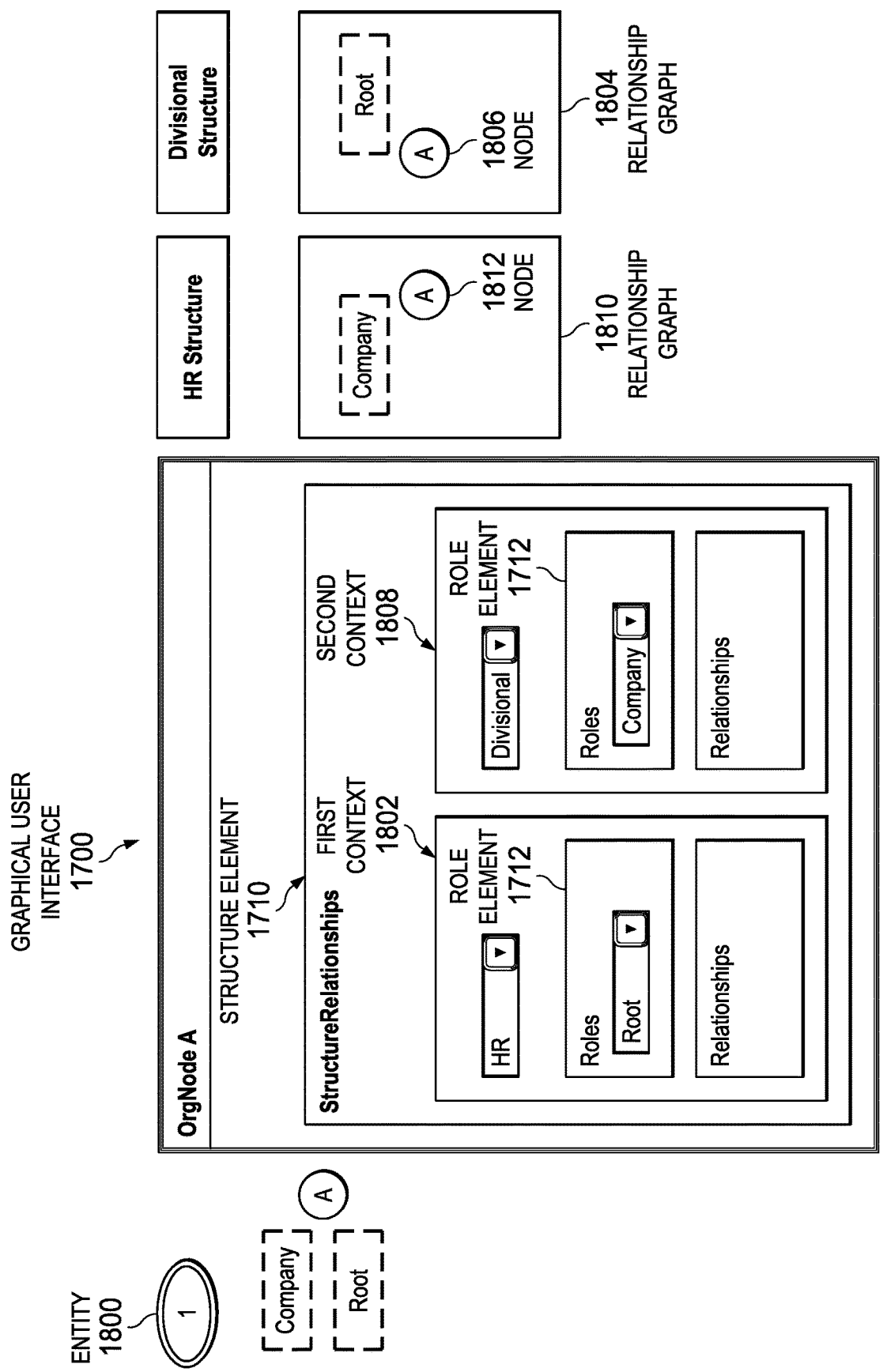
FIG. 18 is an example of a first constructed entity illustrated within a graphical user interface for constructing an entity depicted in accordance with an illustrative embodiment.

Referring now to FIG. 18, an example of a first constructed entity within graphical user interface 1700 is shown according to an illustrative example. Entity 1800 is an example of entity 124, shown in block form in FIG. 1.

Entity 1800 is illustrated as having a number of different relationship context. First context 1802 is the context of a human resources reporting structure, as indicated by structure component 1710. In first context 1802, entity 1800 is assigned the role of "root," as indicated by roles component 1712.

According to first context 1802, a relationship modeler, such as Relationship modeler 122 shown in block form in FIG. 1, represents entity 1800 in relationship graph 1804 as node 1806. Relationship graph 1804 is an example of relationship graph 216 shown in block form in FIG. 2. Node 1806 is an example of one of nodes 218, shown in block form in FIG. 2.

Second context 1808 is the context of a divisional structure, as indicated by structure component 1710. In second context 1808, entity 1800 is assigned the role of "company," as indicated by roles component 1712.

According to a second context 1808, a relationship modeler, such as Relationship modeler 122 shown in block form in FIG. 1, represents entity 1800 in relationship graph 1810 as node 1812. Relationship graph 1810 is an example of relationship graph 216 shown in block form in FIG. 2. Node 1812 is an example of one of nodes 218, shown in block form in FIG. 2.

Figure 19:
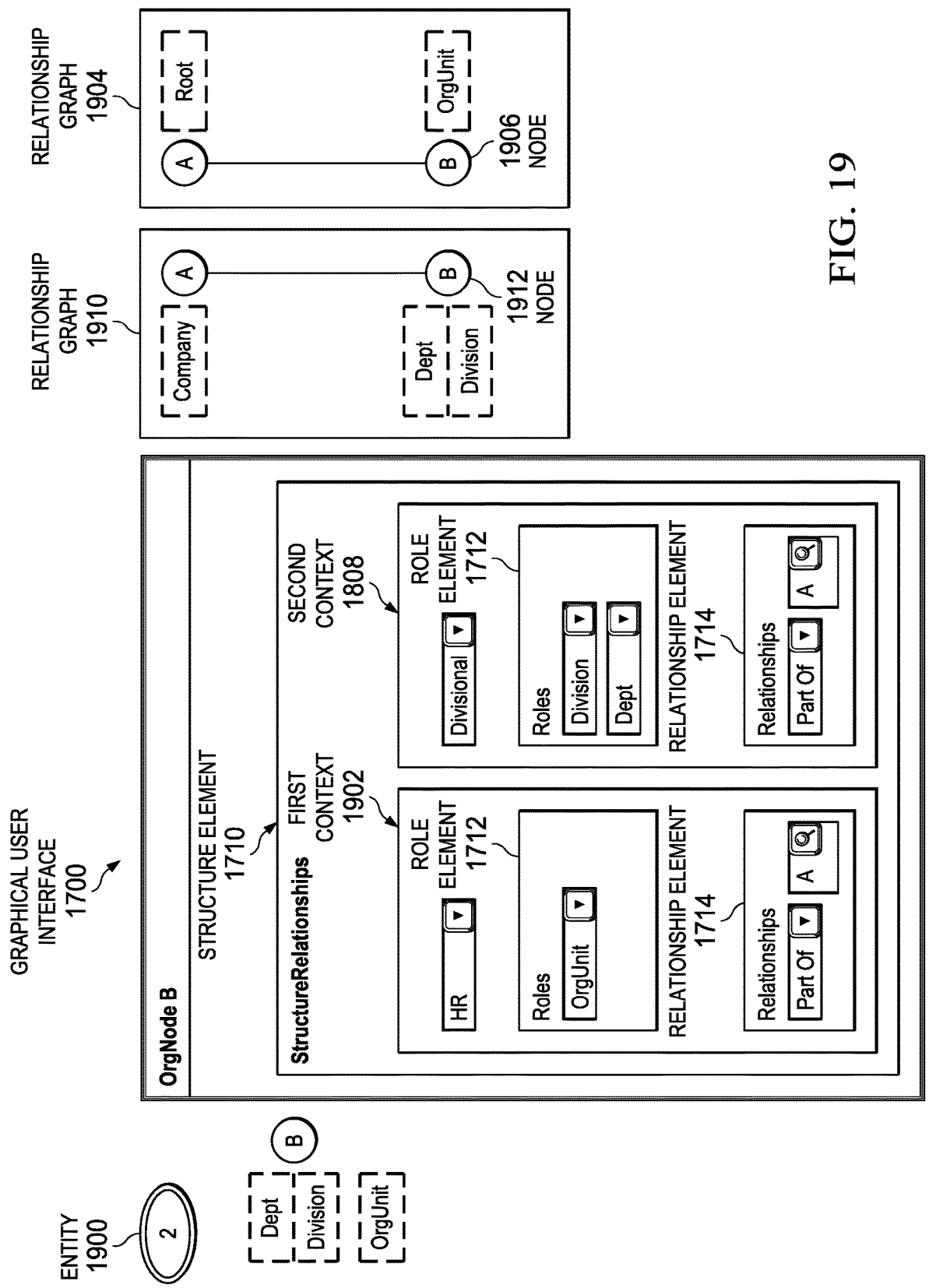
FIG. 19 is an example of a second constructed entity illustrated within a graphical user interface for constructing an entity depicted in accordance with an illustrative embodiment.

Referring now to FIG. 19, an example of a second constructed entity within graphical user interface 1700 shown according to an illustrative example. Entity 1900 is an example of entity 124, shown in block form in FIG. 1. In this illustrative example, entity 1800 forms set of entities 126, shown in block form in FIG. 1, to which entity 1900 is attached according to a defined relationship.

Entity 1900 is illustrated as having a number of different relationship contexts first context 1902 is the context of a human resources reporting structure, as indicated by structure component 1710. In first context 1902, entity 1900 is assigned the role of "organization unit" as indicated by roles component 1712. In first context 1902, entity 1900 is related to entity 1800 according to relationship 800, as illustrated in FIG. 8, as indicated by relationship element 1714.

According to first context 1902, a relationship modeler, such as relationship modeler 122 shown in block form in FIG. 1, represents entity 1900 in relationship graph 1904 as node 1906. Node 1906 is an example of one of nodes 218, shown in block form in FIG. 2.

In second relationship context 1908, entity 1900 is assigned the roles of "division" and "department," as indicated by role component 1712. In second relationship context 1908, entity 1900 is related to entity 1800 according to relationship 800, as illustrated in FIG. 8, and as indicated by relationship element 1714.

According to second relationship context 1908, a relationship modeler, such as relationship modeler 122 shown in block form in FIG. 1, represents entity 1900 and relationship graph 1910 as node 1912. Node 1912 is an example of one of nodes 218, shown in block form in FIG. 2.

Figure 20:
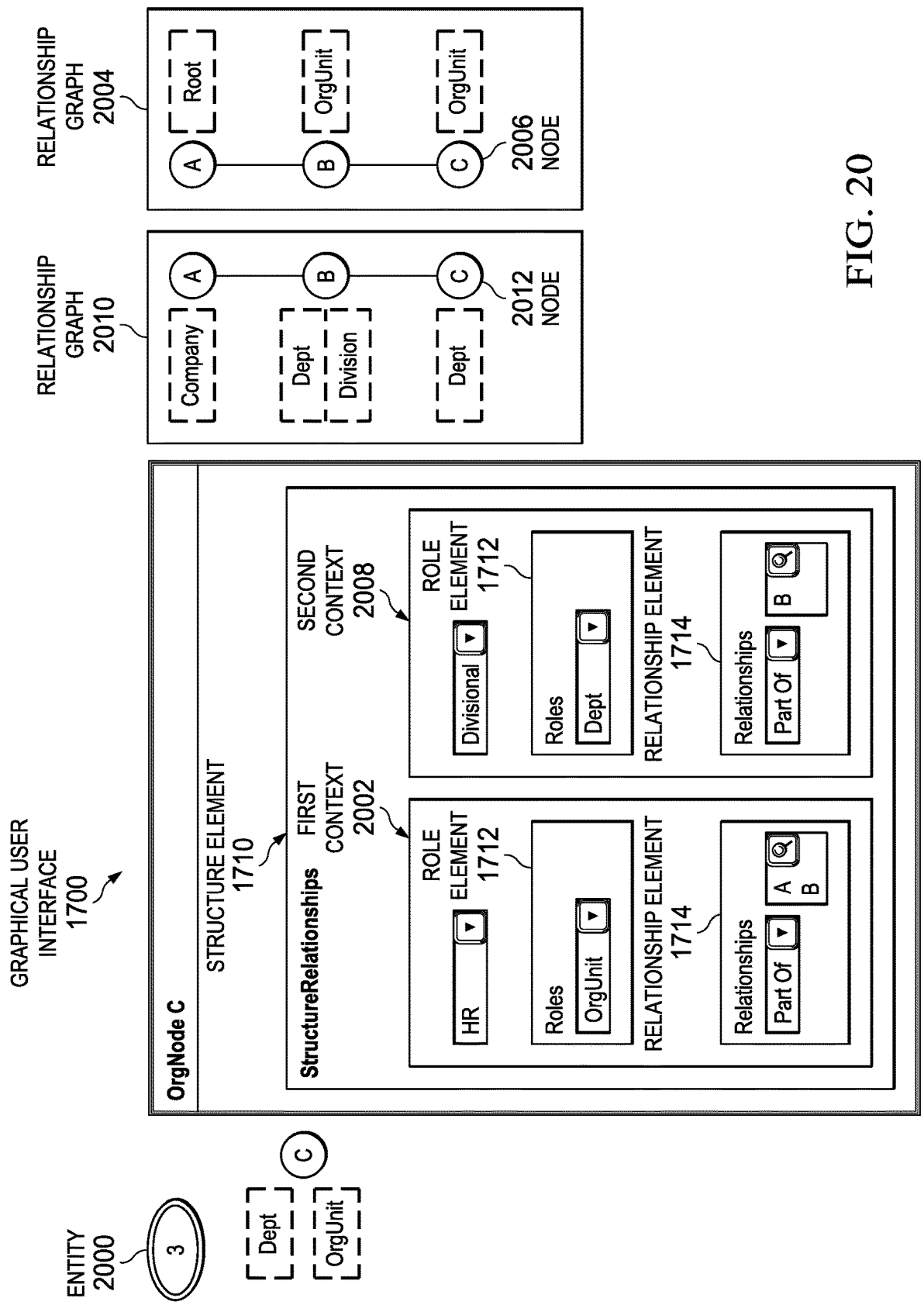
FIG. 20 is an example of a third constructed entity illustrated within a graphical user interface for constructing the depicted in accordance with an illustrative embodiment.

Referring now to FIG. 20, an example of a third constructed entity within graphical user interface 1700 is shown according to an illustrative example. Entity 2000 as an example of entity 124, shown in block form in FIG. 1. In this illustrative example, entity 1800 and entity 1900 form set of entities 126, shown in block form in FIG. 1, to which entity 2000 is attached according to a defined relationship.

Entity 2000 is illustrated as having a number of different relationship contexts. First context of 2002 is the context of a human resources reporting structure, as indicated by structure component 1710. In first context 2002, entity 1900 is assigned the role of "organization unit," as indicated by role component 1712. In first context 2002, entity 2000 is related to one of entity 1800 and entity 1900 according to relationship 800, as illustrated in FIG. 8, and as indicated by relationship element 1714.

According to first context 2002, a relationship modeler, such as relationship modeler 122 shown in block form in FIG. 1, represents entity 2000 and relationship graph 2004 as node 2006. Node 2006 is an example of one of nodes 218, shown in block form in FIG. 2.

In second relationship context 2008, entity 2000 is assigned the role of "department," as indicated by role component 1712. In second relationship context 2008, entity 2000 is related to entity 1900 according to relationship 800, as illustrated in FIG. 8, and as indicated by relationship element 1714.

According to a second relationship context 2008, a relationship modeler, such as relationship modeler 122 shown in block form in FIG. 1, represents entity 2000 in relationship graph 2010 as node 2012. Node 2012 is an example of one of nodes 218, shown in block form in FIG. 2.

Figure 21:
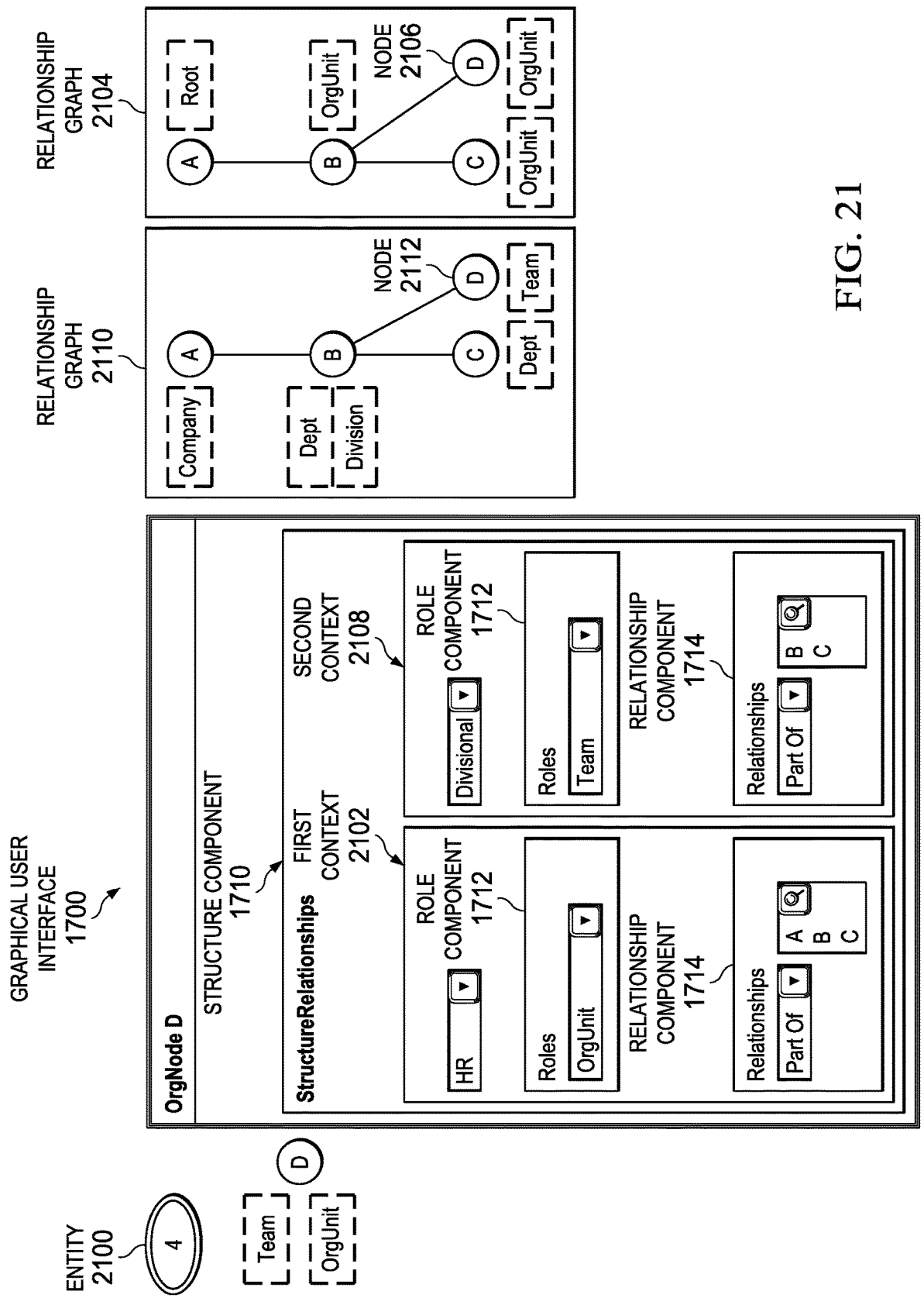
FIG. 21 is an example of a fourth constructed entity illustrated within a graphical user interface for constructing an entity depicted in accordance with an illustrative embodiment.

Referring now to FIG. 21, an example of a fourth constructed entity within graphical user interface 1700 is shown according to an illustrative example. Entity 2100 is an example of entity 124, shown in block form in FIG. 1. In this illustrative example, entity 1800, entity 1900, and entity 2000 form set of entities 126, shown in block form in FIG. 1, to which entity 2100 is attached according to a defined relationship.

Entity 2100 is illustrated as having a number of different relationship contexts. First context 2102 is the context of a human resources reporting structure, as indicated by structure component 1710. In first context 2102, entity 2100 is assigned the role of, "organization unit," as indicated by role component 1712. In first context 2102, entity 2100 is related to one of entity 1800, entity 1900, and entity 2000 according to relationship 800, as illustrated in FIG. 8, and that indicated by relationship element 1714. According to first context 2102, a relationship modeler, such as relationship modeler 122 shown in block form in FIG. 1, represents entity 2100 and relationship graph 2104 as node 2106. Node 2106 is an example of one of nodes 218, shown in block form in FIG. 2.

In second relationship context 2108, entity 2100 is assigned to the role of, "team," as indicated by role component 1712. In second relationship context 2108, entity 2100 is related to one of entity 1900 and entity 2000 according to relationship 800, as illustrated in FIG. 8, and as indicated by relationship element 1714.

According to second relationship context 2108, a relationship modeler, such as relationship modeler 122 shown in block form in FIG. 1, represents entity 2100 and relationship graph 2110 as node 2112. Node 2112 is an example of one of nodes 218, shown in block form in FIG. 2.

Figure 22:
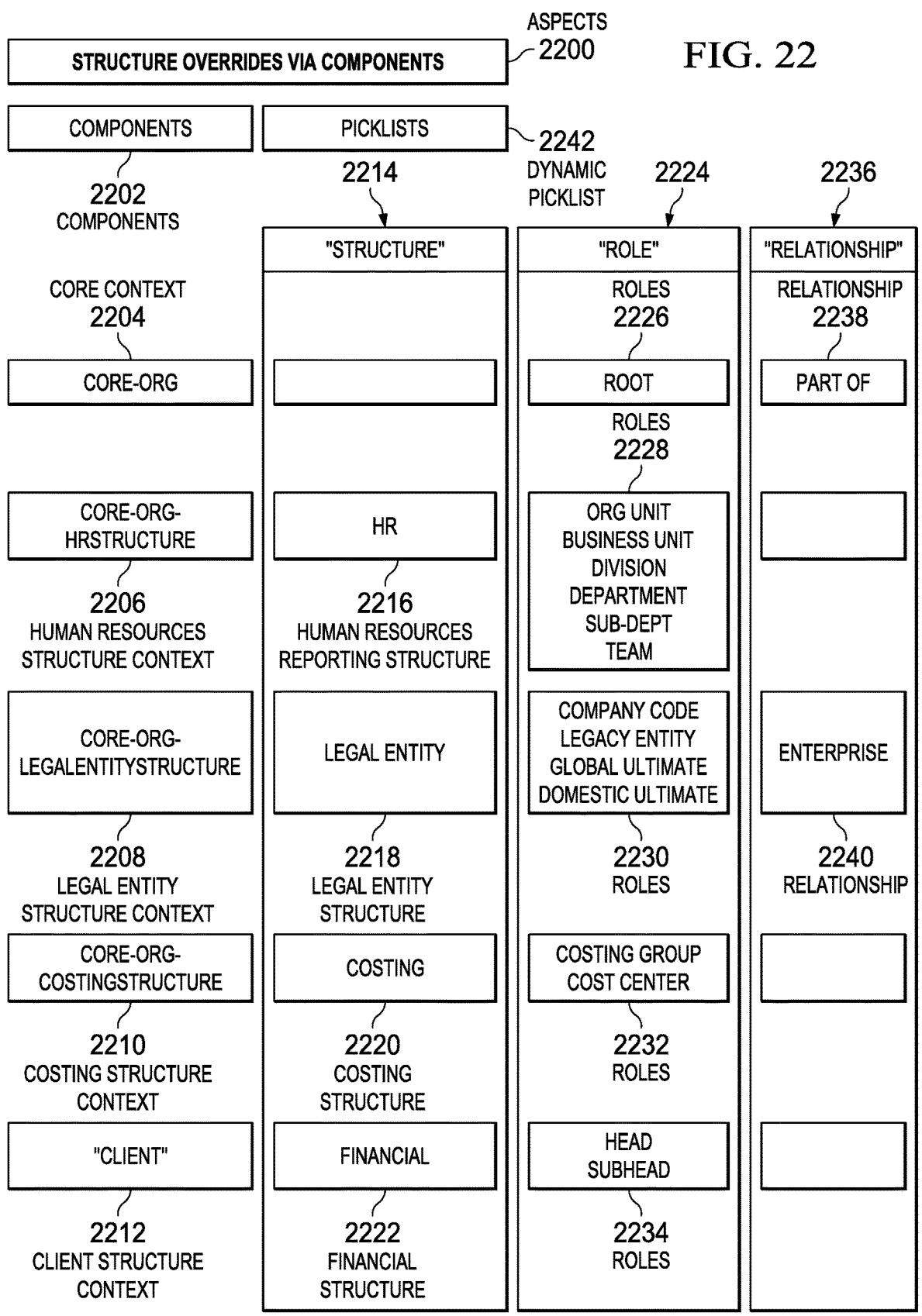
FIG. 22 is an illustrative overview of aspects that can be applied to entities according to a particular relationship context depicted in accordance with an illustrative embodiment.

Referring now to FIG. 22, in overview aspects they can be applied to entities according to a particular relationship context is shown according to an illustrative embodiment. As depicted, aspects 2200 are examples of entity aspects 134, depicted in block form in FIG. 1. One or more of aspects 2200 can be supported with a configuration, such as configuration 136 shown in block form in FIG. 1, as one or more supported aspects, such as supported aspects 138 shown in block form in FIG. 1.

As depicted, aspects 2200 include components 2202. Each of components 2202 provides a relationship context for a particular relationship structure, such as relationship structure 130 shown in block form in FIG. 1. As depicted, components 2202 includes core context 2204, human resources structure context 2206, legal entity structure context 2208, costing structure context 2210, and client structure context 2212.

As depicted, aspects 2200 include structures 2214. Each of structures 2214 implements a particular relationship structure, such as relationship structure 130, according to a corresponding context selected from components 2202. For example, relationship modeler 122, shown in block form in FIG. 1, implements human resources reporting structure 2216 according to human resources structure context 2206. Legal entity structure 2218 is implemented according to legal entity structure context 2208. Costing structure 2220 is implemented according to costing structure context 2210. Financial structure 2222 is implemented according to client structure context 2212.

As depicted, aspects 2200 includes roles 2224. Each of roles 2224 defines a particular role that can be implemented according to a relationship context for a particular relationship structure. For example, roles 2226 can be assigned to entities within a relationship structure implementing core context 2204. Roles 2228 can be assigned to entities within a relationship structure implementing human resource structure context 2206. Roles 2230 can be assigned to entities within the relationship structure implementing legal entity structure context 2208. Roles 2232 can be assigned to entries within the relationship structure implementing costing structure context 2210. Relationships 2234 can be assigned to entries within the relationship structure implementing client structure context 2212.

As depicted, aspects 2200 includes relationships 2236. Each of relationships 2236 defines relationships that can be implemented according to a relationship context for a particular relationship structure. For example, relationship 2238 can be assigned between entities in a relationship structure implementing core context 2204. Relationship 2240 can be assigned between entities in a relationship structure implementing legal entity structure context 2208.

In this illustrative example, each of the structure 2214, roles 2224, and relationships 2236 can be implemented as dynamic pick list 2242. Dynamic pick list 2242 includes default values for each of structure 2214, roles 2224, and relationships 2236.

Dynamic pick list 2242 allows data from structure 2214, role 2224, and relationship 2236 to be stored as platform end metadata, instead of system of record data. By storing relationship data as metadata, relationship modeler 122, shown in block form in FIG. 1, can compare specific relationship values for set of entities 126, shown in block form in FIG. 1, shown in block form in FIG. 1, in a more controlled manner.

Figure 23:
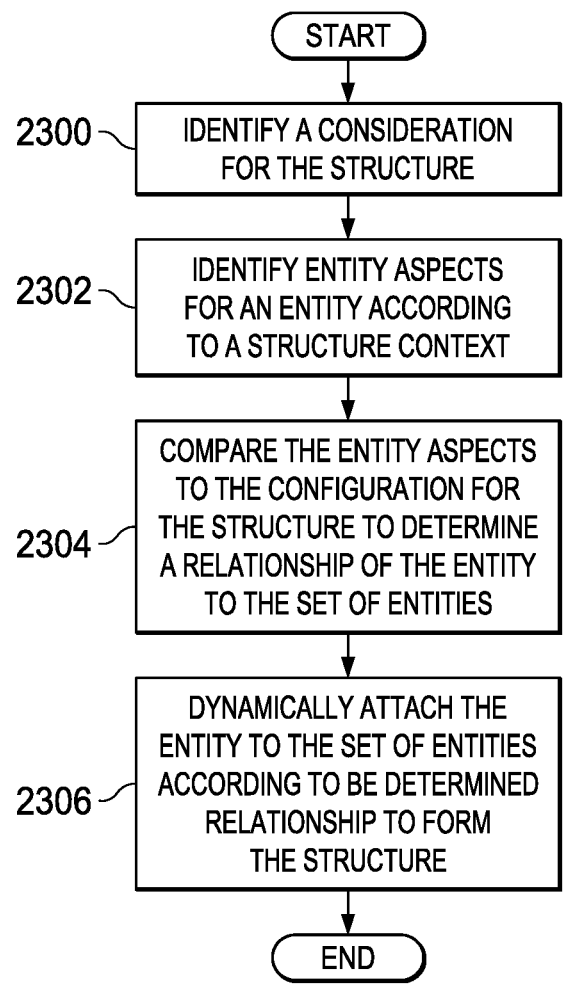
FIG. 23 is a flowchart of a process for modeling multiple relationship dimensions among a set of entities depicted in accordance with an illustrative embodiment.

With reference now to FIG. 23, a flowchart of a process for modeling multiple relationship dimensions among a set of entities is depicted in accordance with an illustrative embodiment. The process depicted in this flowchart may be implemented in relationship modeler 122 in computer system 112 shown in block form in FIG. 1.

The process begins by identifying a configuration for the structure (step 2300). The configuration comprises metadata about supported relationship aspects for the entities within a context for the structure. The configuration can be, for example configuration 136, shown in block form in FIG. 1.

The process identifies entity aspects for any entity according to a structure context (step 2302). The entity aspects comprise metadata about relationships of the entity within the context with structure. The entity aspects can be, for example, entity aspects 134, shown in block form in FIG. 1.

The process then compares the entity aspects to the configuration for the structure to determine a relationship of the entity to the set of entities (step 2304). The determined relationship is one of a number of supportive relationships, such as supported relationships 212 shown in block form in FIG. 2. The determined relationship can be, for example one of relationship 800, relationship 900, relationship 1000, relationship 1100, relationship 1200, and relationship 1300 shown in FIGS. 8-13.

The process then dynamically attaches the entity to the set of entities according to the determined relationship to form the structure (step 2306), with the process terminating thereafter.

In this manner, the process illustrated in FIG. 23 enables modeling multiple relationship dimensions among set of entities 126 in a manner that is consistent with organization units 104 for display in graphical user interface 144 of display system 118. For example, the process illustrated in FIG. 23 enables generating relationship structure 130 that attaches entity 124 to set of entities 126 in relationship structure 130 only if entity aspects 134 of entity 124 meets configuration 136 for relationship structure 130 as defined by policy 140. For example, the process illustrated in FIG. 23 attaches entity 124 to set of entities 126 to form relationship structure 130 only when entity aspects 134 meets one or more rules in policy 140 for configuration 136.

The process illustrated in FIG. 23 presents relationship structure 130 within a graphical user interface 144 such that information, such as information 114 shown in block form in FIG. 1, can be efficiently and easily utilized when performing operations for organization 106.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 24:
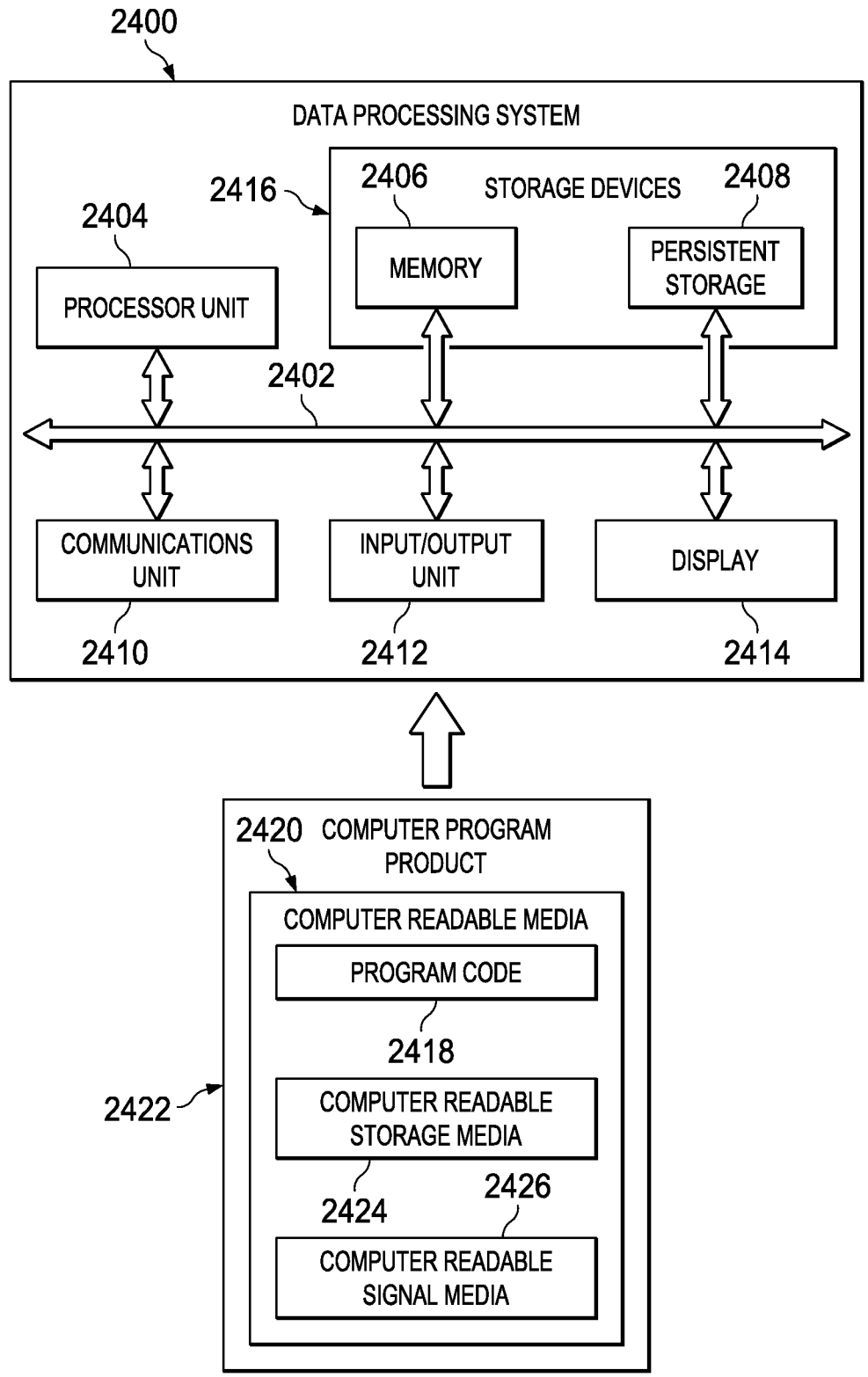
FIG. 24 is a block diagram of a data processing system depicted in accordance with an illustrative embodiment.

Turning now to FIG. 24, a block diagram of a data processing system is depicted in accordance with an illustrative embodiment. Data processing system 2400 may be used to implement computer system 112 shown in block form in FIG. 1. In this illustrative example, data processing system 2400 includes communications framework 2402, which provides communications between processor unit 2404, memory 2406, persistent storage 2408, communications unit 2410, input/output (I/O) unit 2412, and display 2414. In this example, communications framework 2402 may take the form of a bus system.

Processor unit 2404 serves to execute instructions for software that may be loaded into memory 2406. Processor unit 2404 may be a number of processors, a multi-processor core, or some other type of processor, depending on the particular implementation.

Memory 2406 and persistent storage 2408 are examples of storage devices 2416. A storage device is any piece of hardware that is capable of storing information, such as, for example, without limitation, at least one of data, program code in functional form, or other suitable information either on a temporary basis, a permanent basis, or on both a temporary basis and a permanent basis. Storage devices 2416 may also be referred to as computer readable storage devices in these illustrative examples. Memory 2406, in these examples, may be, for example, a random access memory or any other suitable volatile or non-volatile storage device. Persistent storage 2408 may take various forms, depending on the particular implementation.

For example, persistent storage 2408 may contain one or more components or devices. For example, persistent storage 2408 may be a hard drive, a solid state hard drive, a flash memory, a rewritable optical disk, a rewritable magnetic tape, or some combination of the above. The media used by persistent storage 2408 also may be removable. For example, a removable hard drive may be used for persistent storage 2408.

Communications unit 2410, in these illustrative examples, provides for communications with other data processing systems or devices. In these illustrative examples, communications unit 2410 is a network interface card.

Input/output unit 2412 allows for input and output of data with other devices that may be connected to data processing system 2400. For example, input/output unit 2412 may provide a connection for user input through at least one of a keyboard, a mouse, or some other suitable input device. Further, input/output unit 2412 may send output to a printer. Display 2414 provides a mechanism to display information to a user.

Instructions for at least one of the operating system, applications, or programs may be located in storage devices 2416, which are in communication with processor unit 2404 through communications framework 2402. The processes of the different embodiments may be performed by processor unit 2404 using computer-implemented instructions, which may be located in a memory, such as memory 2406.

These instructions are referred to as program code, computer usable program code, or computer readable program code that may be read and executed by a processor in processor unit 2404. The program code in the different embodiments may be embodied on different physical or computer readable storage media, such as memory 2406 or persistent storage 2408.

Program code 2418 is located in a functional form on computer readable media 2420 that is selectively removable and may be loaded onto or transferred to data processing system 2400 for execution by processor unit 2404. Program code 2418 and computer readable media 2420 form computer program product 2422 in these illustrative examples. In one example, computer readable media 2420 may be computer readable storage media 2424 or computer readable signal media 2426. In these illustrative examples, computer readable storage media 2424 is a physical or tangible storage device used to store program code 2418 rather than a medium that propagates or transmits program code 2418.

Alternatively, program code 2418 may be transferred to data processing system 2400 using computer readable signal media 2426. Computer readable signal media 2426 may be, for example, a propagated data signal containing program code 2418. For example, computer readable signal media 2426 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 2400 are not meant to provide architectural limitations to the manner in which different embodiments may be implemented. The different illustrative embodiments may be implemented in a data processing system including components in addition to or in place of those illustrated for data processing system 2400. Other components shown in FIG. 24 can be varied from the illustrative examples shown. The different embodiments may be implemented using any hardware device or system capable of running program code 2418.

Thus, the illustrative embodiments provide a method and apparatus for modeling multiple relationship dimensions among a set of entities. In one illustrative example, a method for modeling multiple relationship dimensions among a set of entities is presented. A computer system identifies a configuration for the structure. The configuration comprises metadata about supported relationship aspects for the set of entities within a structure context. Further, the computer system identifies aspects for an entity according to the structure context. The entity aspects comprise metadata about relationships for the entity within the structure context. Still further, the computer system compares the entity aspects to the configuration for the structure to determine a relationship of the entity to the set of entities. Still further, the computer system dynamically attaches the entity to the set of entities according to the determined relationship to form the structure.

In this manner, the use of relationship modeler 122 has a technical effect of reducing time, effort, or both in generating relationship structure 130 for displaying relationships among organization units 104 on display system 118. In this manner, operation 132 performed for organization 106 may be performed more efficiently as compared to currently used systems. For example, relationship structure 130 may be used to display information 114, including relationships among organization units 104, enabling more efficient performance of operation 132, selected from at least one of hiring, benefits administration, payroll, performance reviews, forming teams for new products, assigning research projects, or other suitable operations for organization 106.

As a result, computer system 112 operates as a special purpose computer system in which relationship modeler 122 in computer system 112 enables modeling multiple relationship dimensions among set of entities 126 in a manner that is consistent with organization units 104 for display in graphical user interface 144 of display system 118. For example, relationship modeler 122 enables generating relationship structure 130 that attaches entity 124 to set of entities 126 in relationship structure 130 only if entity aspects 134 of entity 124 meets configuration 136 for relationship structure 130 as defined by policy 140. For example, entity 124 is attached to set of entities 126 to form relationship structure 130 only when entity aspects 134 meets one or more rules in policy 140 for configuration 136.

Thus, relationship modeler 122 transforms computer system 112 into a special purpose computer system as compared to currently available general computer systems that do not have relationship modeler 122. Currently used general computer systems do not reduce the time or effort needed to enable modeling multiple relationship dimensions among set of entities 126 in a manner that is consistent with organization units 104 four displayed in graphical user interface 144 of display system 118. Further, currently used general computer systems do not provide modeling multiple relationship dimensions among set of entities 126 to form relationship structure 130 only when entity aspects 134 meets one or more rules in policy 140 for configuration 136.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
   modeling multiple relationship dimensions among a set of entities using a relationship modeling environment including a relationship modeling system including a computer system:
   identifying, using the relationship modeling system, a configuration corresponding to a relationship structure wherein the configuration comprises metadata about supported aspects of the configuration and wherein each entity of the set of entities is an organization unit of an organization;
   identifying, using a relationship modeler of the computer system, an entity from among the set of entities, wherein the entity comprises metadata about entity aspects of the entity;
   comparing the entity aspects of the entity to the supported aspects of the configuration, using the relationship modeling system, to determine whether the entity aspects meet one or more rules in a policy for the configuration;
   when the entity aspects meet the one or more rules in the policy for the configuration, determining, using the relationship modeler, a relationship of the entity to the set of entities, and dynamically attaching, using a structure configurator of the relationship modeler, the entity to the set of entities according to the determined relationship to dynamically form the relationship structure;
   after dynamically forming the relationship structure, displaying, using a graphical user interface of a display system, the relationship structure to a user; and
   performing, using the relationship modeling environment, an operation for the organization based on display of the relationship structure to the user, wherein the operation is at least one of hiring, benefits administration, payroll, performance reviews, forming teams for new products, or assigning research projects,
   wherein the relationship structure includes a relationship graph including a plurality of nodes in node-to-node relationship and a plurality of roles corresponding to a structure context, wherein each of the plurality of nodes corresponds to a different one of the set of entities.

2. The method of claim 1, wherein determining the relationship of the entity to the set of entities further comprises the computer system:
   applying a number of configuration rules to the entity aspects to identify a subset of supported aspects; and
   identifying the relationship from a subset of supported relationships.

3. The method of claim 2, wherein the subset of supported aspects comprises:
   supported roles for the set of entities within the structure according to a context of configuration;
   supported relationships for the set of entities within the structure according to the context of the structure; and
   relationship rules for the supported relationships of the set of entities within the structure according to the context of the structure.

4. The method of claim 2, wherein the entity aspects comprise:
   attributes of the entity according to a context of configuration;
   roles of the entity according to the context of configuration; and
   relationships of the entity to the set of entities according to the context of configuration.

5. The method of claim 2, wherein the configuration further comprises:
   a first configuration rule for determining whether a role of the entity is one of a number of supported roles for the set of entities in the structure; and
   wherein comparing the entity aspects to the configuration for the structure to determine a relationship of the entity to the set of entities further comprises the computer system:
   applying the first configuration rule to determine that the role of the entity is one of the number of supported roles for the set of entities in the structure.

6. The method of claim 5, wherein the configuration further comprises:
   a second configuration rule for determining whether a relationship of the entity is one of a number of supported relationships for the set of entities within the structure according to the context of the structure of; and
   wherein comparing the entity aspects to the configuration for the structure to determine a relationship of the entity to the set of entities further comprises the computer system:
   applying the second configuration rule to determine that the relationship of the entity is one of the number of supported relationships for the set of entities in the structure according to the context of the structure.

7. The method of claim 6, wherein the configuration further comprises:
a third configuration rule for determining whether the role of the entity allows a relationship to the entity to the set of entities based on roles for the set of entities; and
wherein comparing the entity aspects to the configuration for the structure to determine a relationship of the entity to the set of entities further comprises the computer system:
applying the third configuration rule to determine that the role of the entity allows a relationship to the entity to the set of entities based on roles for the set of entities.

8. A system comprising:
a relationship modeling environment including
a display system having a graphical user interface and
a relationship modeling system including
a computer system having
at least one processor unit and
a relationship modeler for modeling multiple relationship dimensions among a set of entities, wherein each entity of the set of entities is an organizational unit in a business environment, and wherein the relationship modeler is configured to cause the at least one processor unit to:
identify, using the relationship modeling system, a configuration corresponding to a relationship structure wherein the configuration comprises metadata about supported aspects of the configuration and wherein each entity of the set of entities is an organization unit of an organization;
identify, using a relationship modeler of the computer system, an entity from among the set of entities, wherein the entity comprises metadata about entity aspects of the entity;
compare the entity aspects of the entity to the supported aspects of the configuration, using the relationship modeling system, to determine whether the entity aspects meet one or more rules in a policy for the configuration;
when the entity aspects meet the one or more rules in the policy for the configuration, determine, using the relationship modeler, a relationship of the entity to the set of entities, and dynamically attach, using a structure configurator of the relationship modeler, the entity to the set of entities according to the determined relationship to dynamically form the relationship structure;
after dynamically forming the relationship structure, display, using a graphical user interface of a display system, the relationship structure to a user; and
perform, using the relationship modeling environment, an operation in the business environment based on display of the relationship structure to a user, wherein the operation is at least one of hiring, benefits administration, payroll, performance reviews, forming teams for new products, or assigning research projects,
wherein the relationship structure includes a relationship graph including a plurality of nodes in node-to-node relationship and a plurality of roles corresponding to a structure context, wherein each of the plurality of nodes corresponds to a different one of the set of entities.

9. The system of claim 8, wherein the relationship modeler in determining the relationship of the entity to the set of entities, is further configured to cause the at least one processor unit to:
apply a number of configuration rules to the entity aspects to identify a subset of supported aspects; and
identify the relationship from a subset of supported relationships.

10. The system of claim 9, wherein the subset of supported aspects comprises:
supported roles for the set of entities within the structure according to a context of configuration;
supported relationships for the set of entities within the structure according to the context of the structure; and
relationship rules for the supported relationships of the set of entities within the structure according to the context of the structure.

11. The system of claim 9, wherein the entity aspects comprise:
attributes of the entity according to a context of configuration;
roles of the entity according to the context of configuration; and
relationships of the entity to the set of entities according to the context of configuration.

12. The system of claim 9, wherein the configuration further comprises:
a first configuration rule for determining whether a role of the entity is one of a number of supported roles for the set of entities in the structure; and
wherein the relationship modeler, in comparing the entity aspects to the configuration for the structure to determine a relationship of the entity to the set of entities, is further configured to cause the at least one processor unit to:
apply the first configuration rule to determine that the role of the entity is one of the number of supported roles for the set of entities in the structure.

13. The system of claim 12, wherein the configuration further comprises:
a second configuration rule for determining whether a relationship of the entity is one of a number of supported relationships for the set of entities within the structure according to the context of the structure of; and
wherein the relationship modeler, in comparing the entity aspects to the configuration for the structure to determine a relationship of the entity to the set of entities, is further configured to cause the at least one processor unit to:
apply the second configuration rule to determine that the relationship of the entity is one of the number of supported relationships for the set of entities in the structure according to the context of the structure.

14. The system of claim 13, wherein the configuration further comprises:
a third configuration rule for determining whether the role of the entity allows a relationship to the entity to the set of entities based on roles for the set of entities; and
wherein the relationship modeler, in comparing the entity aspects to the configuration for the structure to determine a relationship of the entity to the set of entities, is further configured to cause the at least one processor unit to:
apply the third configuration rule to determine that the role of the entity allows a relationship to the entity to the set of entities based on roles for the set of entities.

15. A computer program product comprising:
a non-transitory, computer readable storage medium including instructions, the instructions configured to cause a computing device to model multiple relationship dimensions among a set of entities, wherein the instructions comprise:
first program code for identifying, using a relationship modeling system, a configuration for corresponding to a relationship structure, wherein the configuration comprises metadata about supported aspects of the configuration and wherein each entity of the set of entities is an organization unit of an organization;
second program code for identifying, using a relationship modeler of a computer system, an entity from among the set of entities, wherein the entity comprises metadata about entity aspects of the entity;
third program code for comparing the entity aspects of the entity to the supported aspects of the configuration, using the relationship modeling system, to determine whether the entity aspects meet one or more rules in a policy for the configuration; and
fourth program code for, when the entity aspects meet the one or more rules in the policy for the configuration, determining, using the relationship modeler, a relationship of the entity to the set of entities, and dynamically attaching, using a structure configurator of the relationship modeler, the entity to the set of entities according to the determined relationship to dynamically form the relationship structure;
display program code for, after dynamically forming the relationship structure, displaying, using a graphical user interface of a display system, the relationship structure to a user; and
perform program code for performing, using a relationship modeling environment, an operation for the organization based on display of the relationship structure to the user, wherein the operation is at least one of hiring, benefits administration, payroll, performance reviews, forming teams for new products, or assigning research projects,
wherein the relationship structure includes a relationship graph including a plurality of nodes in node-to-node relationship and a plurality of roles corresponding to a structure context, wherein each of the plurality of nodes corresponds to a different one of the set of entities.

16. The computer program product of claim 15, wherein the third program code further comprises:
fifth program code for applying a number of configuration rules to relationship aspects for the entity to identify a subset of supported aspects; and
sixth program code for identifying the relationship from a subset of supported relationships.

17. The computer program product of claim 16, wherein the subset of supported aspects comprises:
supported roles for the set of entities within the structure according to a context of configuration;
supported relationships for the set of entities within the structure according to the context of the structure; and
relationship rules for the supported relationships of the set of entities within the structure according to the context of the structure.

18. The computer program product of claim 16, wherein the relationship aspects for the entity comprise:
attributes of the entity according to a context of configuration;
roles of the entity according to the context of configuration; and
relationships of the entity to the set of entities according to the context of configuration.

19. The computer program product of claim 16, wherein the configuration further comprises:
a first configuration rule for determining whether a role of the entity is one of a number of supported roles for the set of entities in the structure; and
wherein the third program code further comprises:
seventh program code for applying the first configuration rule to determine that the role of the entity is one of the number of supported roles for the set of entities in the structure.

20. The computer program product of claim 19, wherein the configuration further comprises:
a second configuration rule for determining whether a relationship of the entity is one of a number of supported relationships for the set of entities within the structure according to the context of the structure of; and
wherein the third program code further comprises:
eighth program code for applying the second configuration rule to determine that the relationship of the entity is one of the number of supported relationships for the set of entities in the structure according to the context of the structure.

21. The computer program product of claim 20, wherein the configuration further comprises:
a third configuration rule for determining whether the role of the entity allows a relationship to the entity to the set of entities based on roles for the set of entities; and
wherein the third program code further comprises:
ninth program code for applying the third configuration rule to determine that the role of the entity allows a relationship to the entity to the set of entities based on roles for the set of entities.

* * * * *